United States Patent
Scott et al.

(10) Patent No.: US 8,041,613 B2
(45) Date of Patent: Oct. 18, 2011

(54) SYSTEMS, APPLICATIONS AND PRODUCTS IN DATA PROCESSING FOR CROSS DOCK

(75) Inventors: Ryan A. Scott, Alamo, CA (US); Gregory D. Raupers, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 728 days.

(21) Appl. No.: 11/699,153

(22) Filed: Jan. 26, 2007

(65) Prior Publication Data

US 2007/0276684 A1    Nov. 29, 2007

Related U.S. Application Data

(60) Provisional application No. 60/800,763, filed on May 15, 2006, provisional application No. 60/800,780, filed on May 15, 2006, provisional application No. 60/800,779, filed on May 15, 2006, provisional application No. 60/800,767, filed on May 15, 2006, provisional application No. 60/800,766, filed on May 15, 2006, provisional application No. 60/800,765, filed on May 15, 2006.

(51) Int. Cl.
*G06Q 10/00* (2006.01)
*G06G 1/14* (2006.01)
*G06Q 30/00* (2006.01)

(52) U.S. Cl. ............ 705/28; 705/22; 705/330; 705/331; 705/337

(58) Field of Classification Search ........................ 705/8
See application file for complete search history.

(56) References Cited

U.S. PATENT DOCUMENTS

| | | | |
|---|---|---|---|
| 5,774,882 A | 6/1998 | Keen et al. | |
| 5,884,276 A | 3/1999 | Zhu et al. | |
| 6,044,356 A | 3/2000 | Murthy et al. | |
| 6,088,686 A | 7/2000 | Walker et al. | |
| 6,141,653 A | 10/2000 | Conklin et al. | |
| 6,201,539 B1 | 3/2001 | Miller et al. | |
| 7,149,724 B1 | 12/2006 | Flanagan et al. | |
| 7,324,962 B1 | 1/2008 | Valliani et al. | |
| 2002/0019761 A1 | 2/2002 | Lidow | |
| 2002/0049648 A1 | 4/2002 | Inoue et al. | |
| 2002/0095355 A1 | 7/2002 | Walker et al. | |
| 2003/0041024 A1 | 2/2003 | Yim | |
| 2003/0191674 A1 | 10/2003 | Hale et al. | |
| 2004/0073868 A1 | 4/2004 | Easter et al. | |
| 2004/0153396 A1 | 8/2004 | Hinderer | |
| 2004/0181539 A1 | 9/2004 | Munson et al. | |
| 2005/0097571 A1 | 5/2005 | Uguccioni | |
| 2005/0149373 A1* | 7/2005 | Amling et al. | 705/8 |
| 2005/0177435 A1 | 8/2005 | Lidow | |

(Continued)

OTHER PUBLICATIONS

Pre-Appeal Brief Conference Decision Mail Date Apr. 27, 2010; U.S. Appl. No. 11/699,123.

(Continued)

*Primary Examiner* — Fahd A Obeid

(57) ABSTRACT

A system, application and product in data processing is disclosed for cross-dock and direct shipment processes. A default plant on an order is changed to a new plant in another country which is the same country as a customer but a different country than a selling organization. A cross dock partner function is entered to reflect a service provider location in a destination country. The cross dock partner is not a true vendor but rather a place holder for the service provider address used by a delivering warehouse to process the order and output appropriate sales documentation. The order is processed like any other order in the system.

18 Claims, 15 Drawing Sheets

U.S. PATENT DOCUMENTS

| | | | |
|---|---|---|---|
| 2005/0246240 A1 | 11/2005 | Padilla | |
| 2005/0267822 A1 | 12/2005 | Mead | |
| 2006/0036499 A1 | 2/2006 | Leu | |
| 2006/0080251 A1 | 4/2006 | Fried et al. | |
| 2006/0085296 A1* | 4/2006 | Strickland | 705/28 |
| 2007/0156473 A1 | 7/2007 | Colle et al. | |
| 2007/0233728 A1 | 10/2007 | Puteick et al. | |
| 2007/0265874 A1 | 11/2007 | Gardner et al. | |

OTHER PUBLICATIONS

Advisory Action Mail Date Mar. 11, 2011; U.S. Appl. No. 11/699,123.
SAP AG; "Pricing and Conditions (SD-BF-PR) Release 4.6 C"; Apr. 2001, SAG AG, 151 pages.
Merville et al.; "Transfer Pricing for the Multinational Firm"; Oct. 1978, The Accounting Review, vol. 53, No. 4, pp. 935-951.
SAP AG; "SAP Best Practices: J62—Cross-Company-Code Sales Processing—Scenario Business Process Procedure"; Nov. 2003, SAP AG, 15 pages.
SAP AG; "SAP Best Practices: Cross-Company Sales Order Processing (J62)—Building Block Configuration Guide"; Nov. 2003, SAP AG, 7 pages.
SAP AG; "J62 Cross Company Code Sales Order Processing Overview"; Mar. 2004, SAP AG, 5 pages.
SAP AG; "SAP Best Practices: J62—Cross-Company Sales Order Processing—Business Process Procedure"; Jun. 2005, SAP AG, 19 pages.
Big4Guy.Com; "SAP SD Intercompany Sales Processing & Billing"; Apr. 18, 2006, Big4Guy.com, 3 pages.
SAP AG; "SAP Best Practices: Cross-Company Sales Order Processing (J62)—Building Block Configuration Guide"; Jun. 2005, SAP AG, 13 pages.
Non-Final Office Action Mail Date Sep. 25, 2009; U.S. Appl. No. 11/699,094.
Final Office Action Mail Date Mar. 30, 2010; U.S. Appl. No. 11/699,094.
Non-Final Office Action Mail Date Mar. 29, 2011; U.S. Appl. No. 11/699,094.
Non-Final Office Action Mail Date Sep. 30, 2008; U.S. Appl. No. 11/699,152.
Interview Summary Mail Date Dec. 29, 2008; U.S. Appl. No. 11/699,152.
Final Office Action Mail Date Apr. 21, 2009; U.S. Appl. No. 11/699,152.
Pre-Appeal Brief Conference Decision Mail Date Aug. 31, 2009; U.S. Appl. No. 11/699,152.
Pre-Appeal Brief Conference Decision Mail Date Sep. 2, 2009; U.S. Appl. No. 11/699,152.
Examiner'S Answer to Appeal Brief Mail Date Feb. 3, 2010; U.S. Appl. No. 11/699,152.
Examiner'S Answer to Appeal Brief Mail Date Mar. 23, 2010; U.S. Appl. No. 11/699,152.
Decision by the Board of Patent Appeals and Interferences Mail Date Mar. 1, 2011; Appeal No. 2010-006272; U.S. Appl. No. 11/699,152.
Notice of Allowance Mail Date Apr. 27, 2011; U.S. Appl. No. 11/699,152.
Interview Summary Mail Date Sep. 1, 2009; U.S. Appl. No. 11/699,123.
Interview Summary Mail Date Dec. 15, 2009; U.S. Appl. No. 11/699,123.
Non-Final Office Action Mail Date Dec. 3, 2008; U.S. Appl. No. 11/699,123.
Final Office Action Mail Date Jun. 10, 2009; U.S. Appl. No. 11/699,123.
Non-Final Office Action Mail Date Sep. 1, 2009; U.S. Appl. No. 11/699,123.
Final Office Action Mail Date Dec. 28, 2009; U.S. Appl. No. 11/699,123.
Non-Final Office Action Mail Date Jul. 2, 2010; U.S. Appl. No. 11/699,123.
Final Office Action Mail Date Dec. 9, 2010; U.S. Appl. No. 11/699,123.
Non-Final Office Action Mail Date Apr. 12, 2011; U.S. Appl. No. 11/699,123.
Wilson, Nick; "A Guide to Credit Management"; Credit Management: Credit Insight Oct. 1, 2001: ABI/INFORM Global, ProQuest. Web. Jul. 17, 2009.
Non-Final Office Action Mail Date Jul. 9, 2008; U.S. Appl. No. 11/699,310.
Interview Summary Mail Date Oct. 15, 2008; U.S. Appl. No. 11/699,310.
Final Office Action Mail Date Jan. 26, 2009; U.S. Appl. No. 11/699,310.
Advisory Action Mail Date Apr. 8, 2009; U.S. Appl. No. 11/699,310.
Notice of Allowance Mail Date Jul. 20, 2009; U.S. Appl. No. 11/699,310.
Spath et al.; "Inter-company business processes and e-collaboration", Dec. 2005, The Practical Real-Time Enterprise, pp. 13-28.
Picot et al.; "Business process management in real-time companies", Dec. 2005, The Practical Real-Time Enterprise, pp. 29-44.
Election / Restriction Requirement Mail Date Mar. 17, 2011; U.S. Appl. No. 11/699,156.
Non-Final Office Action Mail Date Apr. 25, 2011; U.S. Appl. No. 11/699,156.

* cited by examiner

| COMMERCIAL INVOICE | | | Page 1 of 1 | |
|---|---|---|---|---|
| Ship From:<br><br>San Francisco Plant<br>123 Main St<br>San Francisco, CA 22222 | Reference<br>1255/100250 | Invoice Number<br>90002 | Invoice Date<br>3/26/1998 | |
| | Forwarding Agent<br>Fitz Inc. Ltd. | Letter Of Credit | Mode Of Transport<br>Air | |
| | Carrier/Flight Number<br>AA04 | MAWB/HAWB/BOL<br>074-1234567 | | |
| | Incoterms<br>FOB | Payment Terms<br>Interco 30 Days Net | | |
| Ship To: 100<br><br>Semiconductor Comp.<br>123 Main St.<br>Munich Germany | Sold To: 1000<br><br>Semiconductor Comp.<br>123 Main St.<br>Munich Germany | | | |

| H S Description Of Commodities Marks, Nos, and Kinds Of Packages | | | | Quantity | Unit Price | Value In USD |
|---|---|---|---|---|---|---|
| Item | Customer P.O.<br>Boxes | Customer Part#<br>Part# | Symbolization | Country Of Origin | | | |
| 1 | 48000<br><br>Box 125 124 | S10030<br>Semiconductor | S10030 | SG | 10000<br>EA | 200 | 20000.00 |

*Fig. 6*

|  |  |
|---|---|
| CONTENT UST/MANIFEST (MASTER)<br>ASIA PACIFIC DIVISION<br>990         ROAD<br>SINGAPORE 3399<br>TEL#     710 | Date:    NOV 21, 1997<br>PAGE:    1<br>INVOICE: 007476<br>MANF:    100  1<br>Tot#box: 02<br>WTG:     966 kg |

SHIP TO: 0900049                    SOLD TO:   090004

C/O: FRITZ INC LTD
     HONOLULU INTL AIRPORT
     USA
     TELEPHONE: 852 29567
     FAX NUMBER: 852 29567

EXPORT CONTROL VERIFICATION: G-DEST

| WAYB NUMBER | SOLD TO CUSTOMER | | | WTG |
|---|---|---|---|---|
| BOX NUMBER | DEVICE MARKINGS | DEVICE NAME | QTY | (KG) |
|  | CUSTOMER P/N | DEVICE DESC |  |  |
| 194 |  |  |  | 11.4 |
| AE29 |  |  |  |  |
|  |  | SEMICONDUCTOR/I.C. | 100 |  |
|  |  | SEMICONDUCTOR/I.C. | 3100 |  |
|  |  | SEMICONDUCTOR/I.C. | 2400 |  |
| 1944 |  |  |  | 25.9 |
| AE292 |  |  |  |  |
|  |  | SEMICONDUCTOR/I.C. | 100 |  |
|  |  | SEMICONDUCTOR/I.C. | 100 |  |
|  |  | SEMICONDUCTOR/I.C. | 400 |  |
| SUBTOTAL : |  |  | 6200 | 37.3 |
|  |  |  | cont'd page 2/..... |  |

*Fig. 7*

| | CONTENT UST/MANIFEST (MASTER) | Date: | NOV 21, 1997 |
|---|---|---|---|
| ASIA PACIFIC DIVISION | | PAGE: | 1 |
| 990        ROAD | | INVOICE: | 007476 |
| SINGAPORE 3399 | | MANF: | 100  1 |
| TEL#    7100 | | Tot#box: | 02 |
| | | WTG: | 966 kg |

SHIP TO: 0900049                    SOLD TO:   0900049

C/O: FRITZ INC LTD
                                                   HONOLULU INTL AIRPORT
                                            USA
                                            TELEPHONE: 852 29567
                                            FAX NUMBER: 852 29567

EXPORT CONTROL VERIFICATION: G-DEST

| WAYB NUMBER | SOLD TO CUSTOMER | | | WTG |
|---|---|---|---|---|
| BOX NUMBER | DEVICE MARKINGS | DEVICE NAME | QTY | (KG) |
| | CUSTOMER P/N | DEVICE DESC | | |
| 194 | | | | |
|   AE29 | | | | 11.4 |
| | | | 100 | |
| | | SEMICONDUCTOR/I.C. | | |
| | | | 3100 | |
| | | SEMICONDUCTOR/I.C. | | |
| 1944 | | | 2400 | |
|   AE292 | | SEMICONDUCTOR/I.C. | | |
| 1944 | | | | |
|   AE292 | | | | 25.9 |

SYSTEMS, APPLICATIONS AND PRODUCTS IN DATA PROCESSING FOR CROSS DOCK

REFERENCE TO EARLIER FILED APPLICATION

The present application claims the benefit of U.S. Provisional Application Nos. 60/800,763, 60/800,780, 60/800,779, 60/800,767, 60/800,766 and 60/800,765, filed May 15, 2006, which are incorporated by reference herein.

BACKGROUND

Software solutions may be used to help move companies toward better business practices, such as around order fulfillment, supply chain operations, inventory management, product pricing and global commerce. The solutions may help fast-growing companies decrease the amount of time it takes to establish new business capabilities by focusing on implementing those capabilities that provide the most business impact while making judicious, prudent use of capital. The solutions may provide proven business design alternatives that address various specific needs allowing the solution to be as unique as the business. With such solutions, executives or others at the companies may weigh priorities, tradeoffs and the effort required to produce the desired results, efficiently and directly as well as mitigate the implementation risk.

BRIEF SUMMARY

A system, application and product in data processing is disclosed for cross-dock and direct shipment processes. A default plant on an order is changed to a new plant in another country which is the same country as a customer but a different country than a selling organization. A cross dock partner function is entered to reflect a service provider location in a destination country. The cross dock partner is not a true vendor but rather a place holder for the service provider address used by a delivering warehouse to process the order and output appropriate sales documentation. The order is processed like any other order in the system.

These and other features and advantages of the invention will become apparent upon review of the following detailed description of the presently preferred embodiments of the invention, taken in conjunction with the appended drawings.

BRIEF DESCRIPTION OF THE DRAWINGS

FIG. 6 is a copy of an exemplary commercial invoice.

FIG. 7 is a copy of an exemplary content list manifest.

FIG. 8 is a copy of a second page of the exemplary content list manifest of FIG. 7.

DETAILED DESCRIPTION

The following relates to systems, applications and products in data processing, such as with respect to end customers, credit check, cross docking, expedited orders, inter-company pricing, and partner determination.

End Customer

1. Create/Maintain Master Data—Customers

Figure 1:
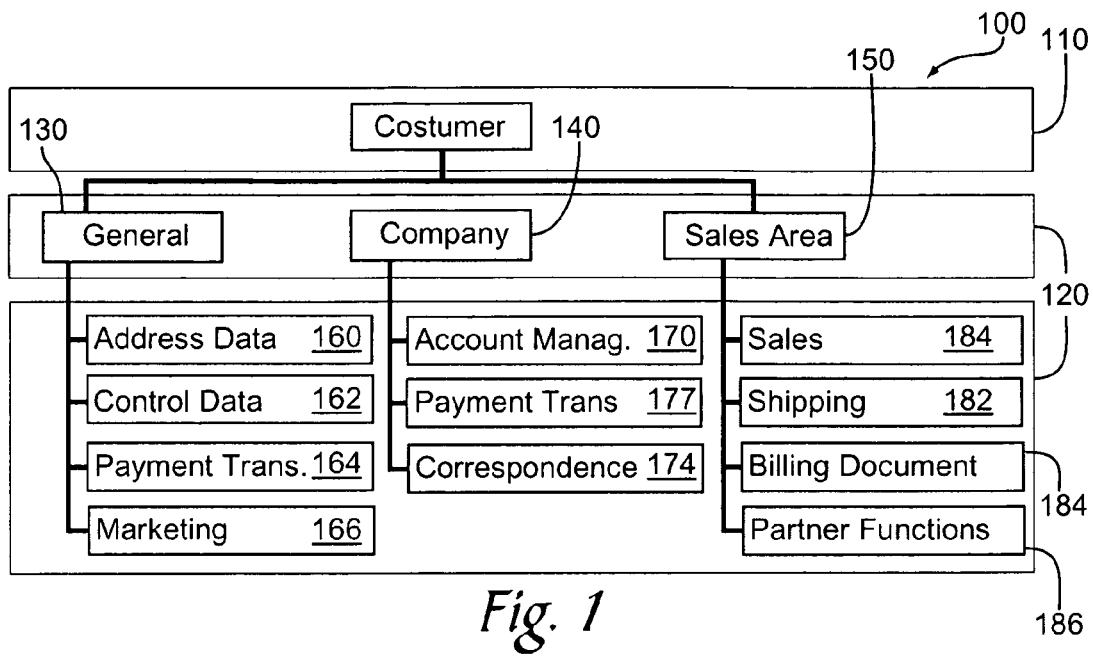
FIG. 1 is a block diagram of an exemplary database structure for storing customer related information.

FIG. 1 is a block diagram of an exemplary database structure 100 for storing customer related information. The structure 100 may include a module 110 and sub-modules 120 for storing information related to sales and sales distribution. The structure may include a setup of a customer master record. The customer master record may be used in the creation of sales documents, deliveries, and billings, as well as for reporting and other activities. The customer master records may be created for specific purposes or functions, e.g., a Sold-To, a Bill-To, Ship-To, Payer, etc. Once the master records are established, customer accounts can be linked together to reflect the structure of the customer, e.g. multiple ship-to's can be linked to a sold-to, and they can also be hierarchically linked to establish account group relationships between sold-to's and central offices, as well as central offices to worldwide accounts.

In the semiconductor industry, for example with regard to semiconductor companies, partner functions may be set up first as a sold-to customer and then as proceeding partner functions. While this may ensure continuity in the data, it has the potential to overload the system with irrelevant information. To try to avoid overload, only the partner functions that are needed be set up in the system may be used. When creating a customer record, certain data fields may be mandatory input, others may be optional, and still others may be for display only depending on the customer account type used, such as sold-to, ship-to, bill-to, etc.

The following is an example of the setup of the different usages, e.g., account types, of customer records for the different types of customers. For process architecture elements, an audience may include credit manager, customer setup, and customer service. Customer master data may include information required by the system to set up a new trading partner, e.g., customer, or maintain an existing trading partner with any of the customer usages of sold-to, ship-to, bill-to, payer, central office, worldwide account, field sales assistant, or sales office.

When creating a new customer account, a common set of customer usages are those associated with a sold-to account which provides automatic additional usage as a ship-to, bill-to, and payer. The stages of setup may include views for address, communications, tax, delivery times, payment, sales, delivery, billing, document creation, and linkage to other associated customer numbers, such as ship-to's, etc. Once the customer is setup, credit limits may be added in a separate series of steps, which may include the setting of a credit risk category and confirmation of a credit review date. After credit has been established, the customer account may be activated for sales document processing.

Master records may be divided into the following areas so that each company code and each sales organization can store its own information for doing business with customers. General data 130 may be data that applies to every sales organization in the company. The general data 130 includes, for example, the customer's name, address, language, and telephone data. Company code data 140 may be data that is specific to an individual company code. Company code data 140 may include, for example, the reconciliation account number, terms of payment, and dunning procedure. Sales area data 150 may be data relevant to the sales organizations and distribution channels of the company. Data that is stored in this area may include, for example, data on order processing, shipping, and billing.

Figure 2:
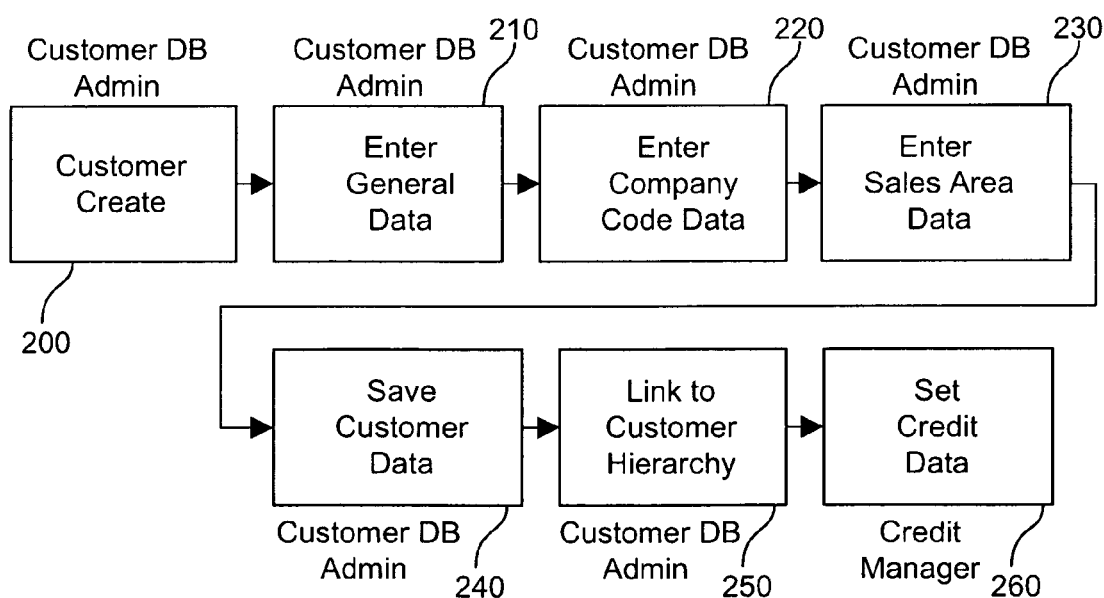
FIG. 2 is a flowchart of an exemplary entering of data.

FIG. 2 is a flowchart of an exemplary way of entering of data. At block 200, a customer file of customer data may be created. At block 210, general data, such as the general data 130, may be entered as part of the customer data. At block 220, company data, such as the company data 140, may be entered. At block 230, sales area data, such as sales area data 150, may be entered. At block 240, the customer data may be saved. At block 250, the customer data may be linked to a customer hierarchy. At block 260, credit data may be set. The system may provide separate functions for maintaining master records, depending on how they are organized. Master records may be maintained centrally for all areas or separately, such as for financial accounting, and sales and distribution. The system may track the end customer when a distributor acts as an intermediary for the industry to understand the client market.

Data for business processes and roles/responsibilities of the system may include Company Code, Sales Organization, Usage of the account, Address, Tax ID, Payment Terms, Sales, Pricing Terms, Billing Terms, Documents required, and other account partner functions such as central office number and world wide account number, or other number used in credit management. After execution, the data may result in a complete customer account being set up in the system and subsequently activated.

To understand concepts in a business case, the following scripts may be executed in sequence, if necessary. A customer sold-to may be created as the partner function to which all others are connected. The customer sold-to script may represent what most people perceive as the true customer. The sold-to may then be connected to the sales hierarchy. The below steps may be used to fully populate a sold to partner. The information may be separated by general, company code, and sales area. The following account types may be used to create each trade partner: Domestic and International Account type; 0001 Inter-company Account type; INT Division/Distribution Channel: 50/50; and One Time Customer Account type: CPD (note: address information is not required).

Referring also to FIG. 1, regarding the General Data 130, an address view tab 160 may include, name, search term, street, city, zip code, country, region and language. The name may be a required input. This may include a customer name that will appear on all correspondences with the customer. Configuration of the field may not be required, such as by using standard functionality of an SAP architecture. One configuration may be suitable for all applications. The search term may be a required input. The search term field may assist the user in finding a customer number when the customer does not know the customer number. The search term field may be used to search for a group of customers that have the search term. For example, if search term equals INTEL is set, a list of all customers containing INTEL may be used. Additional configuration may not be required, such as with the SAP architecture. The street may be a required input. This may be the address for the customer that being dealt with.

The address may include the company's headquarters address but may be another address, such as subsidiary or home addresses. The city may be a required input. This may include the customer's city. This address may be used when communicating with the customer. Configuration may not be required. The zip/postal code may be a required input for most countries. The zip/postal code may be configurable to identify how long the postal code is and if it is required. This may be configurable as Global Settings->Setting countries->Set country-specific checks. The country may be a required input. This may include the customer's country code. The list may include the (International Standards Organization) ISO country code list. The list may be supplied with a basic SAP architecture configuration. The region may include a state, prefecture, e.g. the state code in the US. A configuration path may include Global Settings->Settings countries->Insert regions. The language may be a required input. This may include the language that the customer corresponds in. The list may include the ISO language code list. The list may be supplied with the basic SAP configuration.

Regarding control data 162, tax code information, such as regarding the control number, may be used for reporting to the Internal Revenue Service (IRS). If the customer is also a vendor, the user may include the vendor number to offset open items against each other during the payment process. This is explained more in detail in the accounts receivable area. Regarding the fiscal address, the customer number may be included which contains the official address for tax purposes. The country code may include the ISO country code. The transport zone, the zone within a country that determines how a product is shipped to the customer may be a required input. For example, in the US, the transport zone may relate to the zip code. The whole route and transportation determination process may be documented in a process reference document 1045 to maintain route definition and determination in sales orders and transport orders.

Regarding payment transactions 164, the country may be an optional input on this screen. A key may be used for the country in which the bank is located. An option bank key of the customer may be used in case the company and the customer handle payments electronically. The bank tab may be configured as Financial Accounting->Bank Accounting->Bank Accounts->Define house banks. An optional bank account input may be included. After the user has saved the customer master record, the user may re-enter through the change mode and add the bank account number in this field. The bank account number may be identical to the internally generated customer number that was entered after the user saves the customer master record.

Regarding marketing 166, the legal status may be a required input for inter-company files but optional for others. The marketing field may contain values such as OEM, Government, Inter-company, Subcontractor, etc. The Marketing field may primarily be used for reporting purposes. Marketing field codes can be configured at Sales and Distribution->Master data->Business partners->Customers->Marketing->Define legal statuses.

Other tabs in the General Data 130 may be included such as an unloading points tab. The unloading points tab may include a customer factory calendar field. This field may specify the calendar when the customer is working. The field may help in determining when a customer can receive the product. The user may specify in the calendar that the customer works Monday through Friday and specify when they are on holiday. The calendars may be configured at Sales and Distribution->Master data->Business partners->Customers->Shipping->Define customer calendars. Receiving hours for goods may be input to specify the times, such as in hours, when the customer accepts goods at their location. These fields may be configurable at Sales and Distribution->Master data->Business partners->Customers->Shipping->Define goods receiving hours.

Other tabs may include a foreign trade tab. Date fields may be used for export control. The date fields may include the last date a customer was checked against specified tables, e.g., the table of denial orders. If the flag is set on the date then the customer was found on the table. In addition, information about a contact person may be stored. A department field may be used when contact persons are used. This may be the department that the contact person works in. A configuration may include Sales and Distribution->Master data->Business partners->Contact person->Define standard departments. Also, a function field may be used to indicate the function that the contact person holds within the department. The configuration may include Sales and Distribution->Master data->Business partners->Contact person->Define contact person functions. Partner details may also be available for input.

Regarding Company Code Data 140, an account management field 170 may relate to accounts receivable. A reconciliation account field may be used to specify a general ledger account for posting. A configuration may include Financial Accounting->Accounts Receivable and Accounts Payable->Business Transactions->Down Payment Received->Define reconciliation accounts for customer down payments. Sort key may be included to specify a layout rule for allocation of the line item. The configuration may be included at Financial Accounting->General Ledger Accounting->G/L Accounts->Line Items->Line Item Display->Determine standard sorting for line items.

A payment transaction tab 172 may deal with accounts receivable, financial accounting and billings. Payment terms may by specified in terms of payment with a user's customer. The configuration may be included at Financial Accounting->Accounts Receivable and Accounts Payable->Business Transactions->Incoming Invoices/Credit Memos->Maintain terms of payment. A tolerance group field may be used to allow the user to group customers together in order to handle processing of payment differences. The configuration may be included at Financial Accounting->Accounts Receivable and Accounts Payable->Business Transactions->Incoming Payments->Manual Payment Receipt->Define Tolerances (Customers). Terms of payment for bill of exchange may also be included at the same place of configuration as the payment terms. A lockbox field may be used by the Accounts Receivable (AR) module, such as for financial transactions using a secure account. The configuration may be included at Financial Accounting->Bank Accounting->Bank Accounts->Define lockbox accounts at house banks.

For the Sales Area Data 150, a sales tab 180 may be included. The sales tab 180 may include a currency field that the customer processes their in documents. This may include the default currency for all documents. The configuration may be included at Global Settings->Currencies->Check currency codes. Also included in the sales tab 180 may be an exchange rate type which may include a Company X standard rate, or a specific rate agreed with the customer. For a specific customer rate, a new key may be used for the identification of the record. A sales district field may be contained in a field sales office code (FSO). A configuration may be included at Sales and Distribution->Master data->Business partners->Customers->Sales->Define sales districts. Sales office and sales group fields may contain the current area/region/district codes. These fields may be configured in Enterprise Structure->Maintain Structure->Definition->Sales and Distribution->Maintain sales office or Maintain sales group. The configuration may identify the values.

A next step may be to identify the sales office to a particular sales area and to identify the sales group to a particular sales office. This may be configured as Enterprise Structure->Maintain Structure->Assignment->Sales and Distribution->Assign sales office to sales area or Assign sales group to sales office. A customer group field may be used by Europe to determine the commissionaire country. This field may be configured at Sales and Distribution->Master data->Business partners->Customers->Sales->Define customer groups. A customer pricing procedure field may be used to define which pricing procedure the system can use when the user creates a sales document. The configuration may be included at Sales and Distribution->Basic functions->Pricing->Pricing control->Define and assign pricing procedures->Define Customer Determination Procedure. However, pricing business rules may be reviewed before making the change on the customer.

In the semiconductor industry, inter-company pricing includes a separate pricing procedure which is specific to region and division. The procedures may vary in the way that they recover costs. This means that the same part may include a different cost when coming from two different locations. This is so the holding plant can recover any additional costs associated to the material. A price group field may aid in applying conditions during pricing. This field may be configured as a region code so that the user can set prices by region if the price condition uses the price group. The configuration may be included at Sales and Distribution->Basic functions->Pricing->Maintain price-relevant master data fields->Define pricing groups for customers. A price list type field may define a price list type to apply conditions during pricing or generating statistics. The configuration may be at Sales and Distribution->Basic Functions->Pricing->Maintain price-relevant master data fields->Define Price List Types for Customers. A customer statistics group field may be used to aid in defining a grouping for statistics reporting in the Sales Information System (SIS) part of the SAP system. The configuration may be included at Logistics General->Logistics Information System->Logistics Data Warehouse->Updating->Updating Control->Settings: Sales->Statistics Groups->Maintain statistics groups for customers.

With regard to the Shipping Tab 182, a delivery priority field may be required. The field may set default delivery priority for shipping purposes, such as in the case of military orders. The configuration may be included at Sales and Distribution->Master data->Business partners->Customers->Shipping->Define delivery priorities. A shipping conditions field may be used to define how the product is shipped, e.g., by air, by sea, by surface, etc. A process reference document may maintain route definition and determination in sales orders and transport orders to include more information. The configuration may be included at Sales and Distribution->Shipping->Basic shipping functions->Shipping Point Determination->Define shipping conditions. A delivering plant field may include the default plant from the material master which Company X sends the product from. The configuration may be included at Enterprise Structure->Maintain Structure->Assignment->Sales and Distribution->Assign plant to sales organization and distribution channel. A partial Delivery/Item field may determine if the customer allows partial deliveries or not, and if so, how many deliveries per line item.

At a billing tab 184, a billing schedule may specify the days the user may bill the customer. For example, the customer may want all invoices to be consolidated and sent to them once a week. The configuration may be included at Sales and Distribution->Master data->Business partners->Customers->Billing document->Define billing schedule. An invoice list schedule may specify the customer's factory schedule to process invoice lists. The configuration may be the same place as the customer factory schedule listed above. An incoterms one field may specify the procedure between the shipper and the receiving party of the shipping costs, e.g., FOB, FOD, etc. The configuration may be included at Sales and Distribution->Master data->Business partners->Customers->Billing document->Define Incoterms. An incoterms two field may represent the shipping point for the material. Payment terms payment terms for the freight charges. The configuration may be included at Financial Accounting->Accounts Receivable and Accounts Payable->Business Transactions->Incoming Invoices/Credit Memos->Maintain terms of payment. A credit control area may allow the user to set credit limits. An account assignment group field may be posted for the processing of a sales document. The configuration may be included at Sales and Distribution->Basic functions->Account assignment->Revenue account determination->Check master data relevant for account assignment. A tax code may be entered for each of the countries that are set up to receive products from the sales organization of the customer. The configuration may be included at Sales and Distribution->Basic functions->Taxes->Define tax determination rules.

An output type field may include data for printing documents. The output type may determine when during the sales process that a printed document is created. A transmission medium may specify how the output should generated, e.g., as a paper copy, through edi, a fax, etc. The send time field may specify when the output is created, e.g., during the next batch run, immediately, etc. This data may be filled in completely when the customer people add a new customer. The default settings may be used in order to maintain the same output for all customers.

The Partner Functions Tab 186 may represent a customer hierarchy. If the user is adding a sold-to customer, the screen may allow the user to define the ship-to, payer, ship-to party etc. The user may also define other partners that are associated to the customer and to the user's company. The carrier or forwarding agent may be defined at this tab. The field sales assistant and field sales reps may also be defined here. A partner function label may represent the type of usage for the customer code. The label may also represent the internal people/group that work with the customer. The configuration may be included at Sales and Distribution->Master data->Business partners->Customers->Customer hierarchy->Set partner determination for hierarchy categories.

Figure 3:
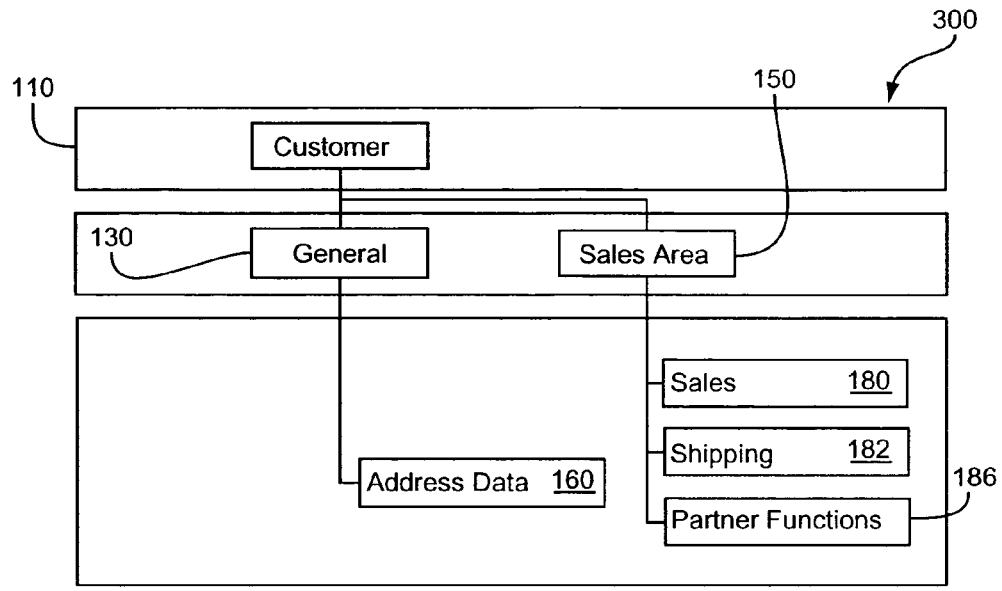
FIG. 3 is a block diagram of an exemplary ship-to partner function which includes a sub-set of the information of FIG. 2.

FIG. 3 is a block diagram of an exemplary ship-to partner function structure 300 which includes a sub-set of the information of FIG. 2. The ship-to partner function 300 may include ship-to, bill-to, and payer information, without requiring all the fields of the data structure 100. Other partner functions may be included as a subset of the sold-to information although alternate partner functions can be added to a sold-to which may have different properties. The shorter ship-to partner function structure 300 may be used, for example, to store information for one-time customers.

Figure 4:
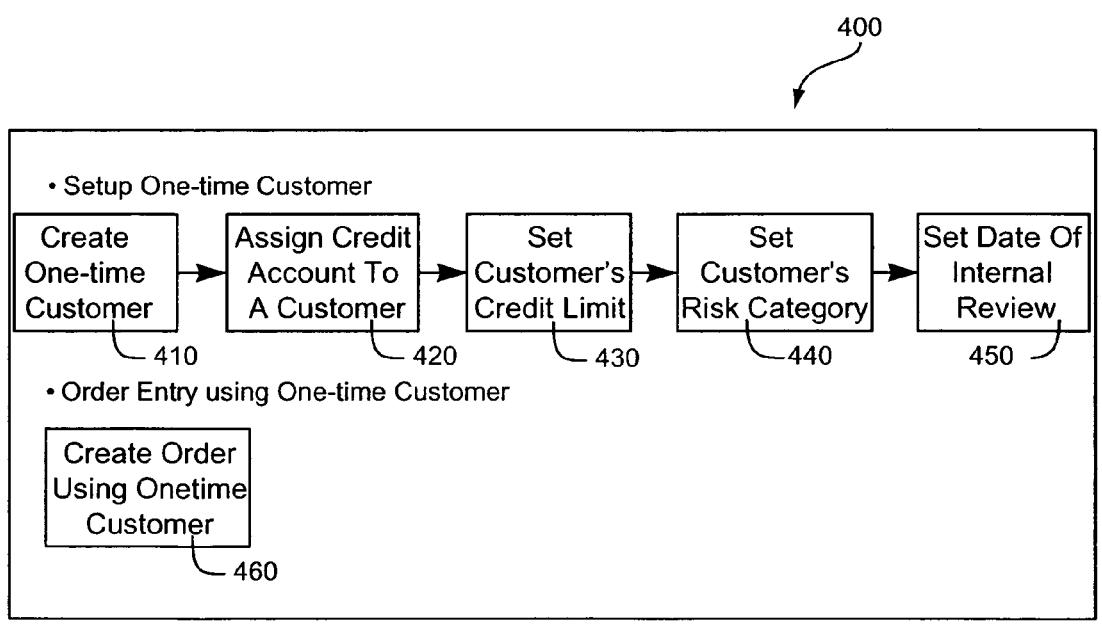
FIG. 4 is a block diagram showing an exemplary setup procedure for a one-time customer.

FIG. 4 is a block diagram showing an exemplary setup procedure 400 for a one-time customer. In SAP, a one time customer may be one with which a long-time relationship does not exist. For this case, no customer master record needs to unnecessarily take up database storage. Therefore, a collective master record may be used. A collective master record may be a dummy record which stores data that may identical to a certain group of customers. The master record may store all one-time customers of the same region using the same currency and same language. During the sales order processing, such as using the collective master record number as the sold-to, the user may enter the data specific to the customer not stored in the collective master record, such as the address.

At block 410, the user may create a one-time customer record. At block 420, the user may assign a credit account to the customer. At block 430, the user may set the customer's credit limits. At block 440, the user may set the customer's risk category. At block 450, the user may set a date of internal review At block 460, the user may create an order for the one-time, or less frequently used, customer. With the customer master with reference it may be possible to create a customer using an existing customer as a model. A combination of Customer number, Company Code, Sales Organization, Distribution Channel, or reference division may be used to automatically populate the new record. The created customer may hold all the same characteristics and partner associations that the referenced customer holds. While creating the customer, fields may be modified to give the master record different characteristics.

In the semiconductor industry, an additional partner function may be created at other semiconductor companies to help track distributor sales. A partner function of EC (End Customer) may be created using the account group as a model. Additional fields may then be added to the base SAP screens to hold customer numbers that are specially stored on the sales orders that are sent from the distributors. A prearranged agreement may be met with the distributors to have them populate that customer information of who they are selling the products to in the orders when they are placed. Through customer code, this information may be stored in SAP and may be assigned to the proper Customer Hierarchy to allow beneficial pricing, such as based on end customer, to be leveraged by the distributors.

Internal customers may be set up using the plant information already in the system. In order for the different plants to transfer material between themselves, the locations may be set up as a customer. The customer may be created using an internal account group, such as ZINT, and may be assigned to the company code level to allow for cross organization transfers. The record may only require the Name, Search term, Address, Rec. Account, and Sort Key.

Figure 5:
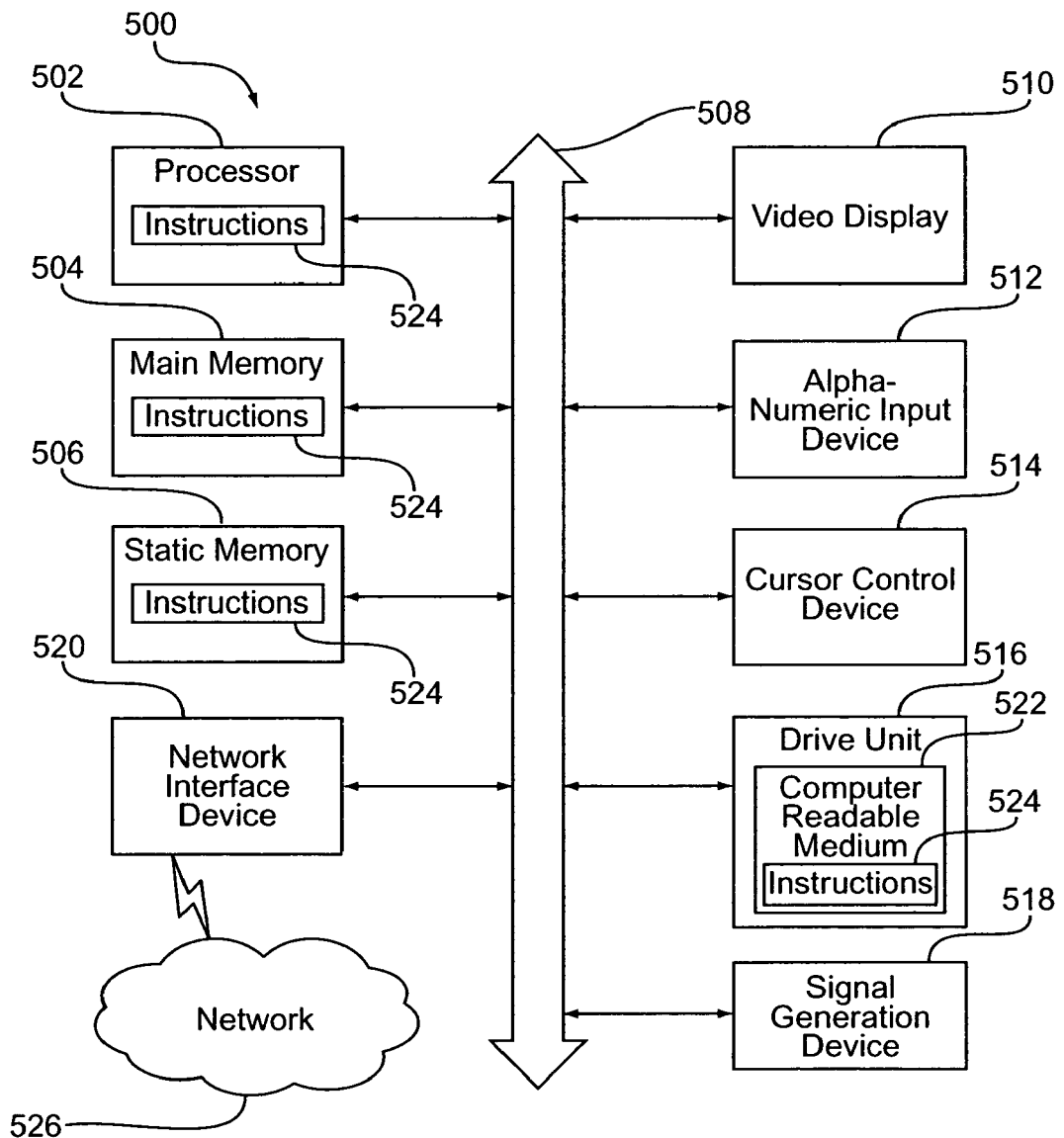
FIG. 5 is a block diagram of an exemplary general computer system.

FIG. 5 is a block diagram of an exemplary general computer system 500 that may be used with to implement the above embodiment and one or more of the below embodiments.

The computer system 500 may include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. The tool may be implemented hardware, software or firmware, or any combination thereof. Alternative software implementations may be used including, but not limited to, distributed processing or component/object distributed processing, parallel processing, or virtual machine processing may also be constructed to implement the tools described herein.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing a set of instructions (sequential or otherwise) that specify actions to be taken by that machine. The computer system 500 may be implemented using electronic devices that provide voice, video or data communication. Further, while a single computer system 500 is illustrated, the term "system" shall also be taken to include any collection of systems or subsystems that individually or jointly execute a set, or multiple sets, of instructions to perform one or more computer functions.

The computer system 500 may include a processor 502, e.g., a central processing unit (CPU), a graphics processing unit (GPU), or both. Moreover, the computer system 500 may include a main memory 504 and a static memory 506 that may communicate with each other via a bus 508. The computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 may also include a disk drive unit 516, a signal generation device 518, such as a speaker or remote control, and a network interface device 520.

The disk drive unit 516 may include a computer-readable medium 522 in which one or more sets of instructions 524, e.g. software, may be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

Dedicated hardware implementations, such as application specific integrated circuits, programmable logic arrays and other hardware devices, may be constructed to implement one or more of the tools described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit.

The present disclosure contemplates a computer-readable medium that includes instructions 524 or receives and executes instructions 524 responsive to a propagated signal, so that a device connected to a network 526 may communicate voice, video or data over the network 526. Further, the instructions 524 may be transmitted or received over the network 526 via the network interface device 520. While the computer-readable medium is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding or carrying a set of instructions for execution by a processor or that cause a computer system to perform any one or more of the methods or operations disclosed herein.

The computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Cross-Dock and Direct Shipment

FIG. 6 is a flowchart of an exemplary cross-dock procedure. For the sake or convenience, the procedure is described in terms of a semiconductor company using the cross-dock and direct shipment processes, but the procedure may be used in other industries as well. The cross-dock process may be an extension of the direct ship process and follow the same processing steps, plus several other steps. Both shipment methods are discussed along with different aspects of each, both in functionality and business processing.

A cross-dock shipment may refer to a consolidated shipment made up of one to many inter-company sales orders, which is taken through customs by a service provider (e.g. FRITZ LOGISTICS), separated at the service provider location, and delivered directly to the customer. The cross-dock process may be used to reduce freight costs, reduce importation taxes, and reduce the documentation required for export processing by consolidating shipments, utilizing inter-company pricing during importation, and breaking them down at a service provider location in the destination country.

Direct Ship may be used to describe the shipment of goods directly to the trade customer against a trade Sales Order. This means that goods may be shipped from an A/T directly to a trade. "Direct Ship" may refer to either inter- or intracompany sales orders, a difference being the requirement for customs documentation for inter-company shipments. For example, a direct shipment might be from an A/T in the U.S. to a customer location in the U.S. or from an A/T in Germany to a customer location in the U.S. In the inter-company example, if there were only one or few packages, the freight savings may not justify consolidation and processing at the service provider location, so they are not being processed as a cross dock. In the intra-company example, the shipment can be picked, packed and shipped using the same processing as a shipment from a distribution center (DC). Direct shipments may be used to reduce inventory carrying costs and to meet customer demand.

A difference between a direct ship and a cross-dock shipment may be that in a cross-dock, the service provider, for example a representative of the semiconductor company, may be responsible for passing the items through customs using inter-company prices on the invoice and then breaking down the shipment and shipping them immediately to the customer.

Inter-company pricing may be used at customs because the shipment is shipping from one company code of the semiconductor company to another company code of the same worldwide semiconductor company. After passing through customs, however, the shipment may be diverted directly to the customer.

In general, overseas cross-company shipments against customer sales orders, whether cross-dock or direct ship, may be processed on an exception basis at the request of the business planner to meet customer demand. The cross-dock process may utilize highly customized functionality and increased manual steps during the order-to-invoice process compared to standard shipments. Manual processes include maintenance on the sales order, a custom transaction to consolidate shipments and create the required documentation, and processing at a service provider location. Still, the cross-dock design may be justified due to the freight cost savings and reduced documentation required during customs processing.

Inter-company cross-dock and direct shipments may be processed to ship goods from between regions without storage at a company facility. These methods may be utilized to meet urgent customer demand and reduce inventory carrying costs. Further, the cross-dock process may reduce importation costs by using inter-company pricing and reducing freight costs by consolidating inter-region shipments. The consolidation of shipments for cross-dock may also reduce the paperwork required for customs. Both processes may require additional processing steps and documentation on top of the standard order to invoice functionality. The cross-dock process may require documentation in addition to the direct-ship process due to the break-bulk that may occur at the service provider location.

The cross-dock shipments may be initiated by the business planner who identifies the requirement to ship from an overseas, cross-company code location direct to a customer. This requirement might be a result of stock-outs in the receiving country's distribution centers (DCs) and/or assembly/test (A/Ts) sights, in combination with demand from a valuable customer. To process a cross-dock shipment, the order processor may change the default plant on the order to the new plant in another company code than the company code of the customer. On the order, a cross dock address partner function may be entered to reflect the service provider location in the destination country (e.g. FRITZ LOGISTICS—New York Harbor). The partner may not be a true vendor, it may have its own account group, but rather a 'place holder' for the service provider address that is used by the delivering warehouse to process the order and output the appropriate documentation.

The order may be processed like any other order in the system when saved. The system may check availability in overseas plants and create the delivery on the appropriate delivery creation date. Cross-dock specific shipping instructions may be provided for the delivering plant via custom coding in the sales order. The delivery may be picked and packed at the warehouse according to standard processing. According to business rules, appropriate deliveries may be consolidated into one waybill. The cross-dock process may require more functionality than the standard waybill transaction in SAP provides. The standard waybill transaction may produce a waybill content list for each customer that summarizes each delivery, its destination, and the contents.

In waybill processing, each individual delivery may receive its own standard trade invoice (F2) created during normal processing as well as the waybill content list. The F2 invoice may be sent to the customer after PGI, per SAP processing. During a cross-dock, the waybill content list may be included in the shipment to aid the service provider in breaking down the shipments and forwarding them to the customer. It may also be possible to send the waybill content list to the service provider as output of the waybill processing. Some semiconductor companies also create manifest shipments, which may consolidate numerous waybills into one shipment. A custom transaction can be used to facilitate this process along with a manifest version of the waybill content list. Manifest shipments are often used by semiconductor companies to further save on freight costs.

Since a cross-dock shipment passes through customs, documentation is presented to customs containing the pricing for each item in the consolidated shipment, in addition to the required import/export information. For a cross-dock shipment, this document may be known as a Master Commercial Invoice. SAP may not support a Master Commercial Invoice for consolidated/waybill shipment, so custom code may be required. One advantage of a Master Commercial Invoice, which is a single document containing the pricing for all materials in a shipment, is that it may greatly reduce the documentation required for customs processing of a consolidated shipment.

One of the purposes of a cross-dock shipment may be to utilize inter-company pricing when bringing the shipment through customs. To do this, the custom Master Commercial Invoice may be designed to display a DC in the receiving country as the Sold-to customer and the Service Provider location as the Ship-to location. The Master Commercial Invoice may display all items in the shipment with the associated inter-company price and will not display any customer information. The document may be a combination of a pro-forma invoice and an inter-company invoice. The document may include the characteristics of the pro-forma invoice, such as no accounting impact and the ability to be created before post goods issued (PGI), and utilize the pricing procedures applicable for an inter-company invoice (IV).

One option to accomplish the requirements of cross-dock processing may be to create a custom transaction. Using this transaction, similar to the standard shipment consolidation/waybill transaction in SAP, any required importation details, such as flight number can be input. Two cross-dock specific documents may be output. One is the Master Commercial Invoice, which may display inter-company pricing for items in the shipment and not contain customer information. In addition, a Master Content List may be output which details the shipment and is used for receiving verifications, identifying/locating 'hot' items, and to facilitate Customs' clearances. Three addresses are shown on the document: the shipping location, which is the supplying Plant; the receiving location, which is the service provider location, e.g. Semiconductor Company X, c/o Fritz Inc Ltd, Service Provider Address, which is the address entered as the Sold-to; and the theoretical destination of the material, which may be a DC in the receiving country, which may be entered as the Ship-to. The material, however, does not ever go to this location. The material is re-routed after customs to the customer location. This address may be important so that the material can be passed through customs using inter-company pricing.

These documents can be sent to the service provider automatically after successfully processing the custom transaction. Consolidated shipments may fall under one of various categories: they may be a domestic (standard) shipment, a direct shipment to a customer in another company code, or they are a cross-dock shipment which is shipped to an interim cross-dock facility, such as one manned by a Service Provider (e.g., via FRITZ-HNL), who will process through Customs on Company X's behalf and forward it to the customer/end-user. If the shipment is sent through the cross-dock, the user may indicate additional information into the custom transaction such as: branding, description, flight details, vendor number of service provider, and vendor account number of the service provider location. This number may indicate that the goods are to travel through that particular entry point for clearing the customs. Each entry point may be set up in the system, for example: Company X, Amsterdam C/O KLM Cargo Logistics SPL/CL. This vendor number may also be entered during sales order maintenance as a partner function.

FIG. 6 is a copy of an exemplary master commercial invoice, FIG. 7 is a copy of an exemplary master content list manifest and FIG. 8 is a copy of another exemplary master content list manifest. Each individual delivery may be packed and consolidated into the large shipment. When the shipment is passed to the forwarding agent, the shipment may be accompanied by the Master Commercial Invoice and Master Content List that is used to bring it through customs.

Once the shipment is Post Goods Issued, two standard billing documents may be created based on the inter-company sale. The first document may be a trade invoice (F2) destined for the customer which contains the customer pricing. This may be the same invoice the customer would get if the materials were sent from the local DC. The customer may need to know that the shipment came from another company code or went through customs. Since the F2 invoice is normally created during the first applicable billing due list run after the delivery is deposit goods issued (PGI'd), during a cross-dock the customer could receive the F2 well before the goods arrive, since the shipment may travel through customs, gets broken down at the Service Provider, etc. If this is undesirable, some companies may place an F2-specific billing block on the order, e.g. 'Transit to Cross Dock', before it is Post Goods Issued. Once the materials are received at the cross-dock location, the billing block may be changed to another block, 'Receipt at Cross Dock'. After the shipment is sent to the customer, the block may be removed and the customer billed. This may ensure that the customer does not receive the Invoice for the shipment before the goods are delivered.

The other document produced after PGI may be a standard SAP inter-company invoice (IV). This document may be created to charge the selling sales organization for the goods that they purchased from the delivering Plant. This document may contain inter-company pricing. For example, if an order from the U.S. Sales Organization was maintained to ship from a German Plant, the IV invoice may charge the Internal Customer of the U.S. Sales Organization for the material.

With regard to semiconductors, when the shipment arrives at the customs location, it may be processed through customs by the Service Provider. The shipment may then be taken to the Service Provider's location. The shipment may be broken down into individual shipments, each detailed out in the Waybill Content List for the shipment. This document helps the Service Provider send each individual shipment to the customer. If a billing block was placed on the customer's order, it may be released at this time to allow for the Trade Invoice (F2) to be created.

A summary of the documents discussed in the design for the cross-dock shipment process. A waybill content list may be produced after each applicable delivery is combined into a waybill for consolidated shipping. This document may not be used for customs and may contain information about each delivery that can be used by the service provider, or Forwarding Agent in the case of Direct Ship to break down the combined shipments and route them to the end customer. A manifest document may be created if the company processes Manifest shipments, which are a further consolidation of several Waybills. This functionality is not standard SAP and may require customization. If used, this document may assist the service provider or forwarding agent in break bulk of the combined waybills for onward shipment to the final customer. This document may be output before the items are shipped.

A Master Commercial Invoice (MCI), such as in FIG. 6, may include a custom output resulting from cross-dock specific inputs entered into a custom transaction. This document may be similar to a Pro-Forma invoice (F8) used for customs purposes, as in the Direct Ship process. The reason a standard pro-forma invoice may not be used during a cross-dock includes: the invoice document shown to customs for a cross-dock should contain inter-company pricing as a main reason for processing a cross-dock shipment and reduce import taxes; the documentation shown to customs should not include customer information, which is standard on a pro-forma invoice; a pro-forma invoice is created based on one delivery document. On the other had, the Master Commercial Invoice may show inter-company pricing for all items in the consolidated shipment (not standard SAP).

Referring to FIGS. 6 and 7, if the company uses manifests, the MCI may contain pricing for all items in the manifest, rather than just on the Waybill. The Master Content List may include a custom output resulting from cross-dock specific inputs entered into a custom transaction. This document may outline all items in the shipment and may be used to bring the consolidated shipment through customs. The document may contain the addresses of the semiconductor locations, rather than the final customer ship-to locations. The final ship-to locations may be located on the Waybill Content List, which is not used for customs. A Trade/Customer Invoice (F2) may be automatically generated by the billing due list after the shipment is Post Goods Issued and sent to the customer. If a billing block is applied, generation of this document may be postponed until the shipment is delivered. This document may contain standard pricing for the customer and may be based on the delivery created from one of the original orders, e.g. it is not a consolidated invoice, since the customer does not know or care that the material was shipped from overseas. An Inter-company Invoice (IV) document may be automatically generated by the billing due list after the shipment is Post Goods Issued. This document may charge the selling Sales Organization, using inter-company prices for the material they bought from the supplying plant.

A cross-dock process may be an extension of the inter-company direct-ship process. As a result, the direct ship process may contain fewer steps than are required in the cross-dock process. The direct ship process discussed may be the inter-company direct ship process, in contrast to a situation where goods are sent from an A/T in one company code directly to a customer in same company code. In the direct ship process, an order may be entered for a customer in one company code with a supplying plant from another company code. This may be termed direct ship, because rather than entering the standard delivering plant on the order, then having the delivering plant send a Stock Transport Order (STO) for the goods to the plant in the other company code, the goods may be shipped straight from the plant in the alternate company code to the customer. This may be an exception process and may be used to reduce inventory carrying costs and help meet customer demand.

Similar to cross-dock, the sales order may be maintained to a plant in another company code. However, no partner function may need to be entered on the order. The cross-dock partner function may be used to designate the address of the service provider facility for the delivering plant and to be mapped onto the shipping documentation. With a direct shipment, the materials may be sent directly through customs to the customer's ship-to location, so the address is unnecessary.

In the semiconductor industry, when the order is saved, the delivery may be created according to standard processes. Since there is no partner function on the order, the warehouse knows that the order is direct shipped to the customer, rather than consolidated and sent to a service provider. However, according to business rules, if there are other deliveries that can be combined onto a waybill and shipped together, the direct shipments may be consolidated for shipment. Direct shipment, however, does not have to be consolidated and could be a one-off shipment.

If the shipment is not consolidated, a standard pro-forma invoice (F8) may be created before the items are post goods issued. This document may be manually created. Along with any required customs documentation, the pro-forma invoice may be used by the carrier to bring the goods through customs. The pro-forma invoice and shipping documentation may contain the customer's sold-to and ship-to information.

If the direct shipment is consolidated using a Waybill, a consolidated pro-forma invoice may be needed to show pricing and contents for all materials going through customs. A difference between cross dock and direct ship may be that the pro-forma invoice, used in contrast to the MCL, contains Trade/Customer pricing since the shipment is clearly going to the customer. This may result in higher taxes. When the materials are Post Goods Issued, a standard trade invoice (F2) may be created along with an inter-company invoice. This process may be similar the cross-dock process since the customer may be billed and the sales organization selling the material may need to pay the supplying plant. The goods may be taken through customs by the carrier using the trade prices on the pro-forma invoice. If the shipment was combined into a waybill, it may be broken down and delivered to each customer as required. However, this break down does not need to occur at a service provider location. The goods may be received at the customer location and may never spend any time at the DC.

A summary of the documents used in the design for the Direct shipment process may be as follows. Waybill content list, if applicable, since not all direct shipments is combined into a Waybill, may be produced after each applicable delivery is combined into a waybill for consolidated shipping. This document may not be used for customs and may contain information about each delivery that can be used by the service provider, or Forwarding Agent in the case of Direct Ship, to break down the combined shipments and route them to the end customer. A Pro-forma Invoice (F8) may be created in contrast to the Master Commercial Invoice used in the cross-dock process. This may be a standard document showing customer prices and materials, which may be required for customs processing. This document may have no accounting impact and may be created before PGI so it can be included with the shipment to assist the carrier in Customs processing. A Trade/Customer Invoice (F2) may automatically be generated by the billing due list after the shipment is Post Goods Issued and sent to the customer. If a billing block is applied, generation of this document may be postponed until the shipment is delivered. This document may contain standard pricing for the customer and may be based on the delivery created from one of the original orders, e.g., not a consolidated invoice, since the customer does not know or care that the material was shipped from overseas. Inter-company Invoice (IV) may be automatically generated by the billing due list after the shipment is Post Goods Issued. This document may charge the selling Sales Organization, using inter-company prices for the material they bought from the supplying plant.

For intra-company direct shipments, only the Trade/Customer invoice (F2) may be required since there is neither a customs requirement nor inter-company sale of goods.

Figure 9:
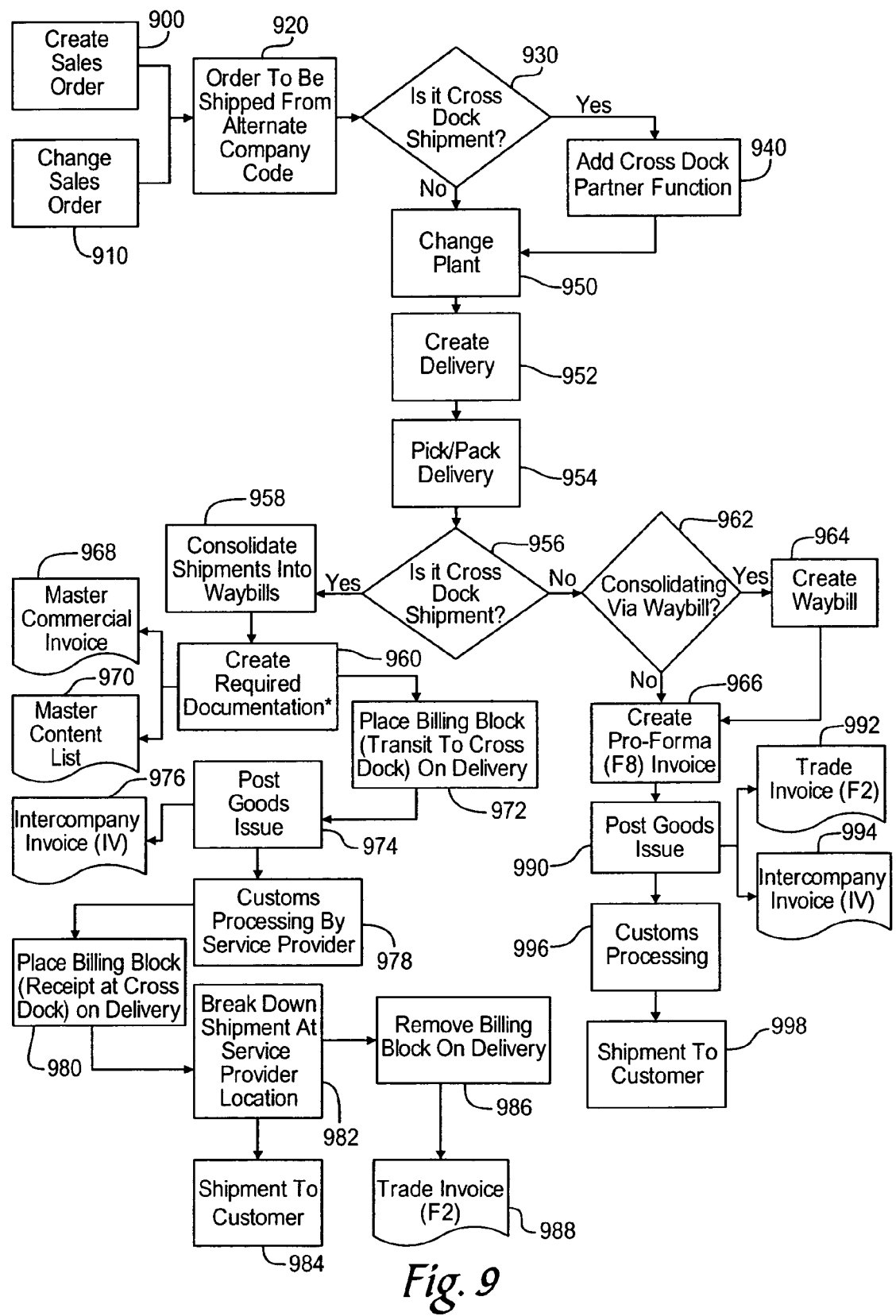
FIG. 9 is a flowchart of an exemplary cross-dock procedure.

FIG. 9 is a flowchart illustrating an exemplary cross-dock procedure. The procedure may also be used to create a Manifest shipment if Manifest shipments are used, e.g., for consolidating Waybills. If so, the Manifest document may also be created. At block 900, a sales order (VA01) may be created. This transaction may create a new Sales Order without reference to an existing document. At block 910, a sales order may be changed. The following data may be entered or changed when creating or changing a sales order: Sales Area; Customer; Material; Original delivering plant; New delivering plant; Cross-Dock Partner Function; Service Provider Vendor Number; Required Customs information, such as Batch Information; Forwarding Agent; Carrier and Flight Number; ECCN and License Information; Delivery numbers for Waybill Consolidation; and Shipping Point of Delivering Plant. Possible resulting data includes: an Inter-company Order is created; Waybill Content List, Master Content List, and Master Commercial Invoice are created and output; Inter-company invoice is automatically created after PGI and Trade (F2) invoice is created after the billing block is released.

After entering the relevant data, the system may generate a Sales Order number. This number may be used in the delivery and shipping documents in order to quickly reference order information. At blocks 920, 930 and 940, if the Business Planner knows that the order is going to be shipped from another company code when it is being created, the Plant and Partner Function, e.g., Cross-dock only, may be entered at this time. If not, at block 950, the Plant Partner Function may be entered using the next transaction. Logistics=>Sales/distribution=>Sales=>Order=>Create (VA01).

At block 952, Delivery Plant at Item Level (VA02) may be created. This transaction may also allow the user to change the delivery Plant. When the Plant is changed, the shipping point and route may automatically change and the ATP check may run again. The plant change may be dictated by the Business Planner and performed by the Order Processor. At block 954, the delivery may be picked and/or packed. Logistics=>Sales/distribution=>Sales=>Order=>Change (VA02). For cross dock processing, a Partner Function may be added to the Sales Order. The new partner identifies the shipment as a cross-dock shipment and identifies the service provider address for the shipping documentation (MCL and MCI). Logistics=>Sales and distribution=>Sales=>Order=>Change (VA02). A Delivery Note may be created to create an outbound delivery by referencing the Sales Order Number. The Delivery Note may be automatically generated. The information entered as part of the Sales Order may be dropped into the Delivery Note automatically. Picking information may also be entered at this time as can information regarding shipping and packing. However, shipping and packing data need not necessarily be entered as they may be entered and updated later. The Partner Function entered on the order may be copied onto the delivery. The deliver document may be created using a Deliver Due List variant assigned to a Batch Job. Logistics=>Sales and distribution=>Shipping=>Delivery=>Create (VL01N).

Picking a delivery, e.g., without Warehouse Management System, may allow the user to change picking options from what was entered in the delivery note. This process step may allow the quantities picked to be updated, but may not allow the user to specify a particular pick location as this option may not be available in a Lean WM system. Logistics=>Sales and distribution=>Shipping=>Delivery=>Change (VL02N).

Regarding Packing, a Shipment Number/Waybill may be created. This script may create a shipment number in the Transportation module and consolidate all the given delivery notes. This step may be executed if this is the first Shipment Number created for the customer; otherwise, this step may be skipped. A waybill may allow for extra shipping information to be added. Logistics=>Sales and distribution=>Transportation=>Shipment=>Create (VT01N).

Shipment Numbers may be displayed for a customer. This script may display all or any Shipment Numbers for a single customer, which may have been created for those that have not been invoiced. This may be required such that a late Sales Order released Delivery Note may be added into the same Shipment Number to facilitate waybill shipping consolidation, finalization and printing. Logistics=>Sales and distribution=>Transportation=>Shipment=>List=>Planning (VT11).

A delivery may be added to a Shipment. This script describes how to add a delivery note to an existing shipment to facilitate consolidation and processing. The shipment cannot have already been scheduled for delivery. Logistics=>Sales and distribution=>Transportation=>Shipment=>Change (VT02). For pack deliveries in a Shipment, this script may describe how to consolidate and pack items from multiple delivery notes into the same shipping container. Additional modifications to the Waybill can be made during this change transaction. Logistics=>Sales and distribution=>Transportation=>Shipment=>Change (VT02N). The shipping units, e.g., cartons, may be Weigh/reweigh shipping units (cartons). The need may arise where the shipping containers/cartons are required to be weighed individually for tracking and shipping documentation purposes. The deliveries have already been packed into the appropriate shipping unit. A packing/content list may be output. Logistics=>Sales and distribution=>Transportation=>Shipment=>Change (VT02N).

At block 956, it may be determined when the shipment is a cross dock shipment. At block 958, cross dock processing may include consolidating shipments into waybills. At block 960, required documentation may be created, such as to ship the materials through customs. At block 962, if the shipment is not a cross dock shipment, but a direct shipment, it may be determined whether to consolidate via a waybill. At block 964, if consolidation is being accommodated with a waybill, the waybill may be created. At block 966, whether or not a waybill is created, a Pro-forma Invoice may be manually created for the direct shipment. Using the delivery document number, the pro-forma invoice can be output and included with the shipment to facilitate custom processing. Logistics=>Sales/distribution=>Billing=>Create (VF01).

At blocks 968 and 970, regarding the semiconductor industry, a Master Commercial Invoice and Master Content List may be created for a Customs Transaction. The user may enter the required customs and shipping information. If the company is using manifest shipments, the waybill numbers may be entered here and consolidated into one manifest shipment. Either way, all materials included in the shipment may be included on the Master Commercial Invoice with inter-company pricing. In addition, the Master Content List may be output. These documents may accompany the shipment and may be output and sent to the Service Provider as well.

At block 972, the billing block, transit to cross dock, may be placed on delivery. At block 974, the goods may be posted to issue. At block 980, if a single delivery is to be shipped via a cross-dock, a custom billing type can be created by copying the F8 and using inter-company invoice IV pricing settings. This document can then be created at this point using VF01. The materials are now ready to be shipped. At block 978, customs may be processed by the service provider. At block 980, the billing block, receipt at cross dock, may be placed on delivery. At block 982, the shipment may be broken down at the service provider location. At block 984, the shipment may be made to the customer. At block 986, the billing block may be removed on delivery. At block 988, the trade invoice (F2) may be sent.

A Goods Issue may be executed for a single delivery (VL02N). The post goods issue transaction may be performed after a delivery is completely prepared for shipping. This transaction updates the inventory and initializes the required financial postings. This transaction or an above script may be used. Logistics=>Sales & Distribution=>Shipping and Transportation=>Outbound Delivery=>Change (VL02N). In the semiconductor industry, manifest shipments may be used in order to combine multiple deliveries for shipment for one carrier. This solution may not cover manifest shipments as they are not necessary for shipping purposes. However, some semiconductor companies use manifest shipments to save on freight costs.

Inter-company Billing may be used for Cross Dock shipment (VF01). The Inter-company Invoice, such as at block 976, may be created initially for Cross-Dock shipments. Subsequently the Trade Invoice, at block 988, may be used when the Cross-Dock is finally released for shipment to the customer on the due date. The timing between creations of Inter-company and Trade Invoices may depend on Shipping/Customer Receiving dates. Logistics=>Sales/distribution=>Billing=>Create (VF01).

A billing block to the Trade Invoice may be temporarily created when this Trade Invoice is issued at an A/T or Service Provider processing a Cross-Dock Sales Order, with SAP's Direct-Ship functionality. This may be conditioned that the goods, remain in Company X premises and are owned by Company X. The Billing Block code is TR for Transit to Cross-Dock. To place the billing block on the Delivery, the user may select Goto—Header—Financial Processing. Logistics=>Sales/distribution=>Shipping=>Change (VL02).

When receiving at Cross Dock Facility, regarding a Service Provider's actions, a billing block to the Trade Invoice may be temporarily created when the Trade Invoice is issued at an A/T. Otherwise, the Service Provider may process a Cross-Dock Sales Order, with SAP's Direct-Ship functionality. This may conditioned that the goods, remain in Company X premises and are owned by Company X. The code may be changed to RV to signify receipt at the x-dock and to continue to block trade invoice creation. To place the billing block on the Delivery, the user may select Goto—Header—Financial Processing. Logistics=>Sales/distribution=>Shipping=>Change (VL02).

When shipping from Cross Dock to Customer, such as for the Service Provider's actions, the Billing Block (VL02) is removed, such as at block 986. This script may be used by user when a delivery note with a Billing block code is obtained. Removing all blocks may enable the creation of the Trade Invoice, such as at block 988. To remove the billing block on the Delivery, the user may select Goto—Header—Financial Processing. Logistics=>Sales/distribution=>Shipping=>Delivery=>Change (VL02).

Regarding direct shipping, at block 990 good issue may be posted. At block 992, trade invoices may be created and at block 994 inter-company invoice may be created. At block 996, custom processing may be accomplished. At block 998, the shipment may be made to the customer.

For cross dock and/or direct ship, the two invoices are created, e.g., the trade invoice (F2) and the inter-company invoice (IV) may be displayed and verified. (VA03). The F2 or master commercial invoice in FIG. 6 may handle external billing to the customer, and invoice (IV) may handle internal costs, such as associated with transferring the material from one company code or plant to another. The script may demonstrate that in a direct ship or cross-dock, a trade and an inter-company invoice are created. It may also show that the inter-company billing is between two internal company codes. Logistic=>Sales/distribution=>Sales=>Order=>Display (VA03).

Credit Checking

Figure 10:
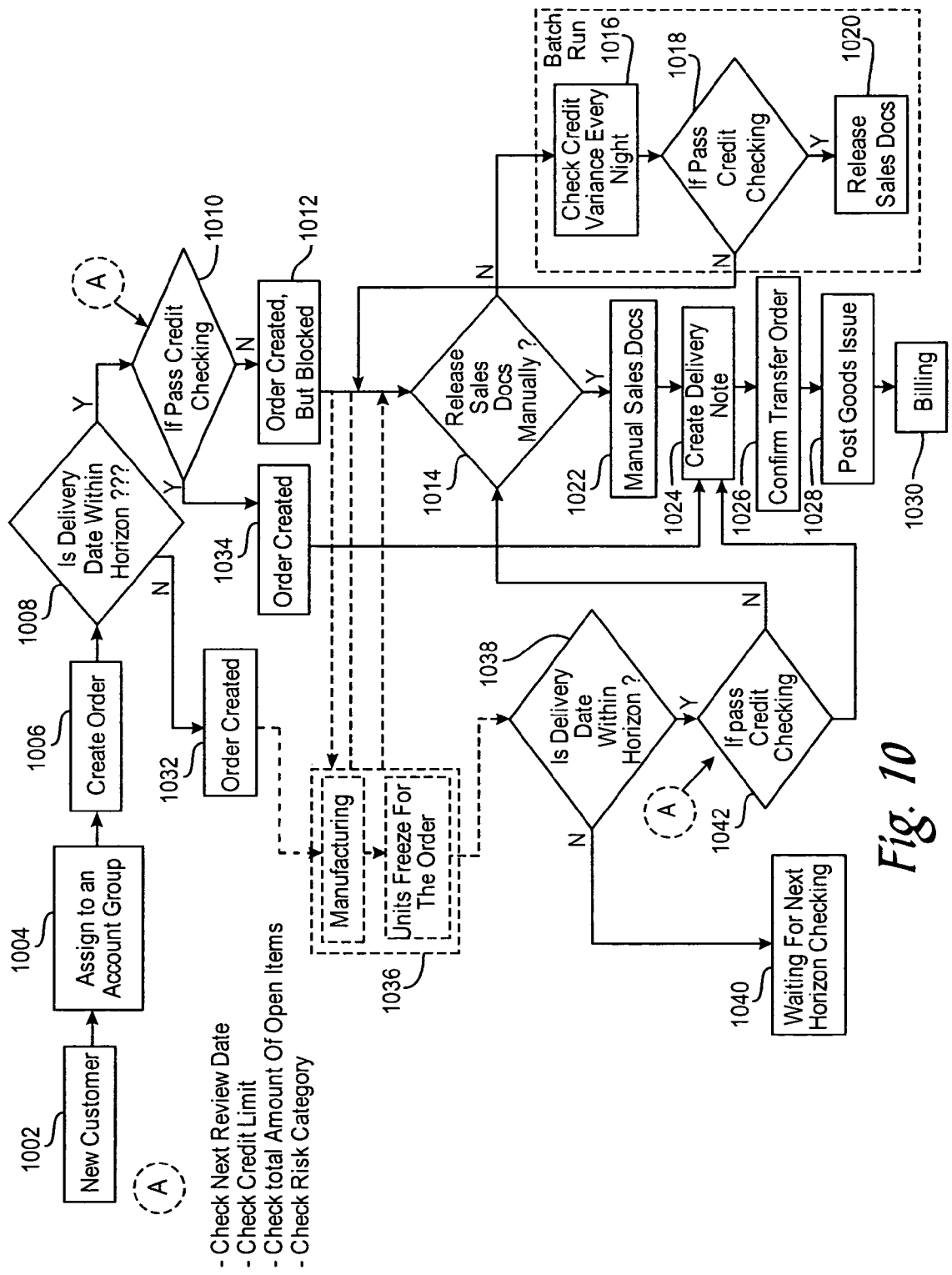
FIG. 10 is a flowchart illustrating a process for credit checking.

FIG. 10 is a flowchart illustrating a process for credit checking. Credit checking may involve various functions. At block 1002, a file for a new customer may be created. Credit Limit may be defaulted to 'zero' and that the Risk-Category may be defaulted to 'NEW' for a newly created customer. At block 1004, the new customer may be assigned to an account group. At block 1006, a new order may be created.

As described later in more detail, the process of the system may confirm that an order create is not allowed when Credit limit is 'zero' and Risk category is 'NEW'. The process may demonstrate how to assign Credit limit and Risk category. The process may confirm that without a Next-Review-Date assigned, both order create and delivery create is disallowed. The process may confirm that once a Next-Review-Date is passed, both order create and delivery create is disallowed. The process may confirm that with Risk-Category of UNL (unlimited amount) of orders and deliveries may be created if the next-review-date is assigned. The process may confirm that with Risk-category other than UNL or CH (credit hold), order can be created regardless of the total amount of exposure (open invoice+in process delivery+backlog), assuming next-review-date is assigned. The process may confirm that when the credit limit is exceeded, delivery notes can be created (with a warning message) but they may be blocked for further processing (Picking/packing) until they are unblocked, assuming next-review-date is assigned. Similarly, when the process fails aging invoice control criteria, delivery notes may be created, such as with warning message, but the process may be blocked for further processing, assuming next-review-date is assigned.

Described herein are credit checks and the credit information that may be established for each company code. The configuration for individual customers is also covered. The different types of credit checks available and outline the industry best practice are discussed. In order processing, the credit status may be used to block the following functions: Creating material reservations; Creating purchase requisitions; Creating production orders/planned orders; Creating delivery due indices; Printing order confirmations; and Creating deliveries. In Shipping, the credit status can be used to block picking, packing, posting goods issue, and printing delivery notes. In standard SAP R/3 there may be nine different types of credit checks that can be performed. A user may define any one of the checks for various combinations of credit control area, risk category, and document credit group.

For a static control check, a customer's credit exposure may not exceed the established credit limit. The credit exposure may be the total combined value of the following documents: Open orders; Open deliveries; Open billing documents; and Open items, such as accounts receivable. The open order value may be the value of the order items which have not yet been delivered. The open delivery value may be the value of the delivery items which have not yet been invoiced. The open invoice value may be the value of the billing document items which have not yet been forwarded to accounting. The open items may represent documents that have been forwarded to accounting but not yet settled by the customer.

At block 1008, the process determines whether the delivery date is within a horizon. A credit horizon may be used in SAP to specify the duration of time that may be taken into account when checking a company's credit. The system may be set up to only review certain types of documents and the date that the document impacts. At block 1010, if the delivery date is within the horizon, the process performs a credit check. For a dynamic credit limit check such as with Credit Horizon, or another credit method, such as another one that may be used with SAP, the customer's credit exposure may be split into a static part, such as open items, open billing, and delivery values, and a dynamic part, such as the open order value. The open order value may include all undelivered or only partially delivered orders. The value may be calculated on the shipping date and stored in an information structure according to a time period that the user specifies, such as days, weeks, or months. When the user defines the credit check, a user may then specify a particular horizon date in the future, for example: 10 days or 2 months, depending on the periods the user specifies. For the purposes of evaluating credit, the user may want the system to ignore all open orders that are due for delivery after the horizon date. The sum of the static and dynamic parts of the check may not exceed the credit limit.

Regarding a maximum document value, the sales order or delivery value may not exceed a specific value which may be defined in the credit check. The value may be stored in the currency of the credit control area. This check may be useful if the credit limit has not yet been defined for a new customer. The check may be initiated by a risk category which may be defined specifically for new customers.

The credit check may be triggered by changes made in the document to values in any of the credit-sensitive fields. According to the user's custom settings, the system may run a check credit between changes or differences in the sales order data against the default values in the customer master record. Examples of such fields may be terms of payment and fixed value dates. The process may use the date of the next credit review as a trigger for an automatic credit check. If the user processes a sales order after a customer's next review date has expired, the system may automatically carry out a credit check. The relation between open items which are more than a certain number of days overdue and the customer balance may not be allowed to exceed a certain percentage. The oldest open item may not be more than a specified number of days overdue. The customer's dunning level may only reach a specified maximum value. To carry out checks other than the standard checks, a user may define checks in the appropriate user exits in Customizing for Sales. The Credit Limit may be managed on different levels, such as the Central Office (COF) level, the Credit Control Area (CCA) level, or the individual Payer level:

In SAP, credit may be controlled at the credit controlling account (CCA), which may default to the Payer level. When a new Sold-to customer is created, the Payer and credit controlling account, such as on the credit master record, numbers may be defaulted to the Sold-to number. This type of setup may support the options above. In this scenario, an individual credit limit may be established and credit checking may be performed at the individual payer/CCA level.

Scenario 1.
SP1 - - - PY1 (CCA1=PY1)
SP2 - - - PY2 (CCA2=PY2)

SP3 - - - PY3 (CCA3=PY3)

In this scenario, invoices may be billed and customer statements may be sent to the individual payers.

In the semiconductor industry, in addition to SAP's default credit management system, the following two scenarios may be configured to meet the needs. If multiple Sold-to's share the same Payer, the credit limit may be managed collectively. The user may therefore assign each of the Sold-to's to the same Payer. The payer number may relate to one, and only one, credit control area in the credit master record. When an order is placed for any sold-to which is tied to this collective payer, the credit may be managed at that payer/CCA level.

Scenario 2.
SP1 - - - PY1 (CCA1=PY1)
SP2 - - - PY1 (CCA1=PY1)
SP3 - - - PY1 (CCA1=PY1)

In this scenario, invoices may be billed and customer statements may be sent to the collective payer. A difference from the first scenario is that the first scenario may take into account only one groups' financial transactions. In the second scenario, multiple groups may contribute to the data collected when the credit check is performed.

It may also possible to manage the credit limit at the COF (Central Office) level. There may be one COF number per multi-national customer per region. For example, all of the Customer Y Sold-to numbers in the USA may link to one common COF number while all of the Customer Y sold-to number in Asia may link to a different COF number. This rule may apply for all other regions as well. The four COF numbers may further consolidate to a World-Wide Consol number for reporting purposes.

The following scenario is an example, where the credit limit is managed at the Customer Y USA COF level, as well as at the individual payer/CCA level. Although there may be multiple Payers, this can be achieved by assigning a COF number to all of the Payer/CCAs that are to be credit controlled by this COF on the credit master records. The credit limit may be set at both the individual payer/CCA levels as well as at the COF level. The credit checking may also performed at both levels.

Scenario 3.
SP1 - - - PY1 (CCA1=PY1) - - - \
SP2 - - - PY2 (CCA2=PY2) - - - >COF
SP3 - - - PY3 (CCA3=PY3) - - - /

In this scenario, invoices may be billed and customer statements may be sent to the individual payers.

Finally, in some cases, it may be necessary to control the credit limit collectively yet continue to bill the payers individually. This may be achieved with the following setup. The individual sold-tos may be tied to the individual payers, therefore allowing for the individual billings and customer statements. However, each of the payers may be associated with the same CCA, therefore, collectively controlling the credit checking.

Scenario 4.
SP1 - - - PY1 (CCA1=PY1)
SP2 - - - PY2 (CCA1=PY1)
SP3 - - - PY3 (CCA1=PY1)
   credit checked at CCA1

In this scenario, invoices may be billed and customer statements may be sent to the individual payers.

Base SAP may manage credit limit at one level, either at Payer/CCA Level, which may be one Sold-to or multiple Sold-to numbers, or at the collective level as in scenario 4. Without custom code, the SAP may not have the capability to manage credit limit at individual level as well as the COF level. The user, typically the credit manager, may assign the Payer with any Credit Controlling Account, on the credit master record, even if the CCA has no relation to the sold-to. In another words, SAP may not validate the CCA to prevent human error.

The following credit control settings may be recommended for the semiconductor industry. Credit checks may be based on the following configuration settings: Credit Horizon, Date of Next Review, Overdue Open Items, Credit Limit, and Risk-Category. The credit limit may be managed at the Central Office and payer levels, as per Scenario 3. Since Financial Accounting and Sales Processing are centralized, the CCA may be the same as the Sales Organization, meaning there may be one CCA per country. This may be true for all geographies. There may be exceptions, however, such as Asia. Certain Asian countries such as Japan may require separate CCAs due to unique country regulations and requirements.

A dynamic, horizon based credit check may be used. The credit check may be invoked at delivery note generation. When the credit check occurs, the credit limit may be compared against all the orders within the horizon. The credit check date may be based off of the EPSD (Early Possible Ship Date). If there is no credit problem, a delivery note may be created automatically when the delivery date is reached. If there is a credit issue, the system may automatically block delivery create for all orders in the horizon and the credit manager may have to release orders manually. The horizon may be configured for each risk category. Since it is under configuration and is controlled by security level, users cannot view or change the horizon in the credit master file.

At block 1012. if an order fails the credit check at order create, delivery note create, or during the run of the batch job, the order may be blocked and may appear on an on-line report displayed through SAP transaction code VKM1. At block 1014, when appropriate, a user, such as a credit manager, may release each delivery that failed the credit check individually. The release concept in SAP may be that of a "horizon" release. A release may approve credit for all items within the horizon. At blocks 1016, 1018, and 1020, every order and delivery within the horizon may be released and may not be subject to future credit checks. Any items which were outside of the horizon may be checked once they move into the horizon, and at that point the order may be blocked again according to the credit status at that point in time.

At block 1022, if the sales documents are released manually, manual sales documents may be prepared. At block 1024, a deliver note may be created. At block 1026, a transfer order may be confirmed. At block 1028, the posted goods may be issued. At block 1030, the billing may occur.

A Risk-Category of UNL ("Unlimited") may be assigned by the user to mean that unlimited orders and deliveries can be created, regardless of the credit limit status (credit limit−[open invoice+delivery+open order]) or the number of aging invoices. Using this risk-category may be similar to excluding a customer from credit checks. For customers who have credit problems, a risk category of CH (credit hold) may be used.

This risk category may trigger a credit check at both order create and delivery create events. At blocks 1032 and 1034, if the delivery date is not within the horizon, or the delivery date is within the horizon and the credit check passed, the order may be created. At block 1036, if the order was not created within the horizon, or if the order was created within the horizon but blocked, manufacturing may be updated and/or units for the order may be frozen. Thereafter, such as at block 1038, the process may again determine if the delivery date is within the horizon. At 1040, if the delivery date is not yet within the horizon, the process may continue to check for the next horizon. At block 1042, when the delivery date is within the horizon, the process may determine if the credit check has passed. Checking the credit may entail checking a next renew date, checking a credit limit, checking a total amount of open items, and other checks, such as checking a risk category.

In addition to the risk-category UNL, other risk-categories may be set up that may be custom tailored to different customers' requirements. These may be configured such that the customer is put on delivery stop, such that orders can still be created, when: a) Overdue Open Items exceed a certain % (the percentage is configurable); b) Credit Limit has been exceeded (comparing credit limit with open invoice+delivery+x number of days of backlog); and c) Next Review Date has passed. The 'x' number of days can be utilized in any increment, such as in days, weeks or months. A standard setting may be one day of backlog. SAP may include backlog into credit calculation in delivery creates, such as at least one day of backlog, and also the next-review-date. Each user, such as a region credit manager, may decide which risk-categories are needed and the percentage of aging invoices to be allowed for each of them.

The system may be configured such that next-review-date is mandatory in delivery create. The process of this system may help the credit manager track the customer's credit. The system also allows users to input some text to serve as a reminder as to the purpose of the coming credit review. The Next-Review-Date may be configured for each individual customer in the system, however, if there are users who do not find the function useful, they can assign a next-review-date very far in the future, such as fifteen years in the future. A rationale for allowing delivery note creation but blocking the pick/pack process in the case of insufficient credit limit or large amount of aging invoices may be for operational efficiency. The credit manager may then be able to browse all of the delivery notes blocked and work on each of them. As soon as the credit problem is fixed, he/she can then unblock the order.

Figure 11:
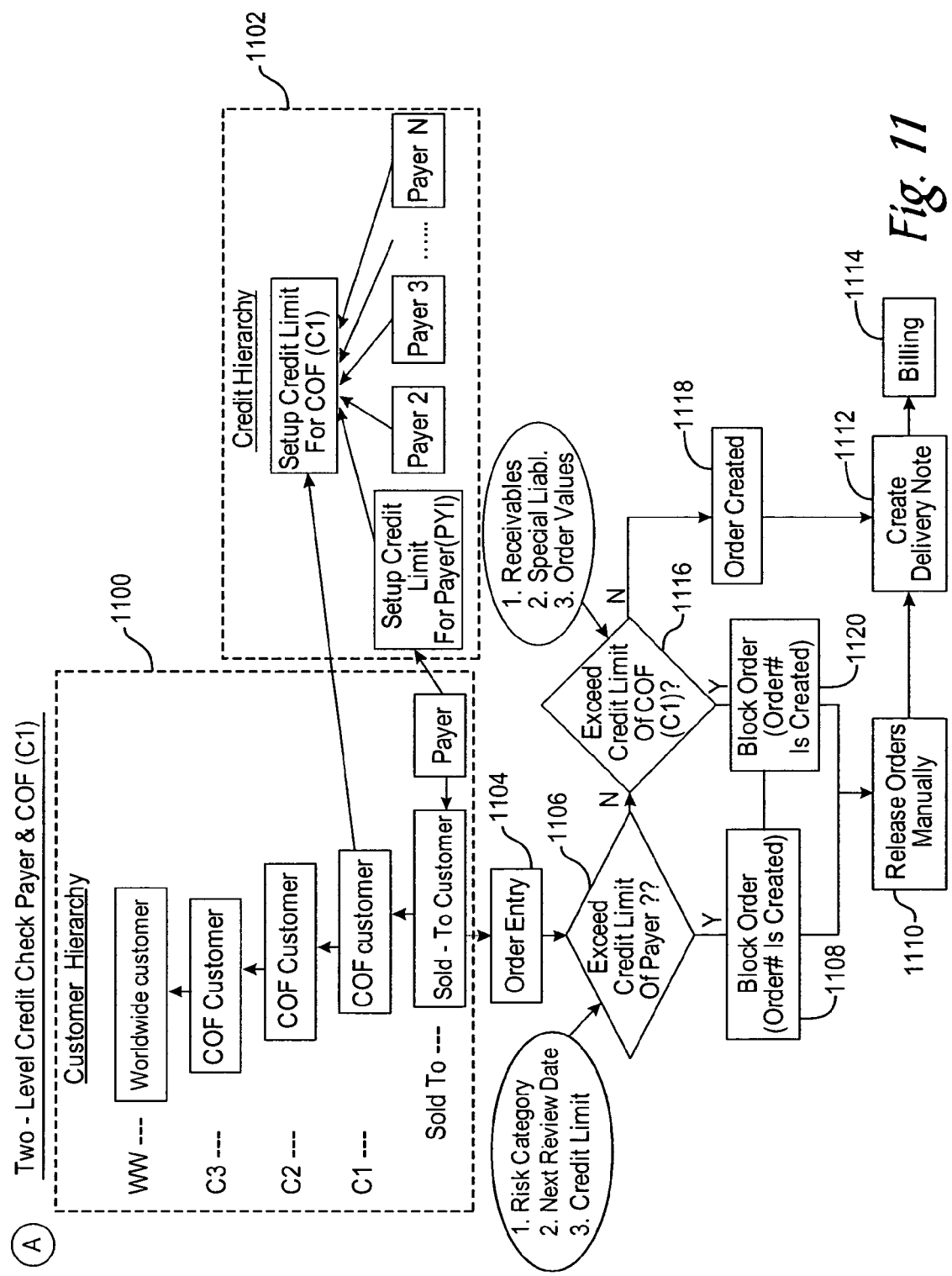
FIG. 11 is a flowchart illustrating a two-level credit check for a payer and central office.

FIG. 11 is a flowchart illustrating a two-level credit check for a payer and central office. At block 1100, customers may be arranged by hierarchy. The hierarchy may include different levels of central office customers C1, C2, C3, worldwide (WW) customers and sold to customers. At block 1102, a credit hierarchy may be established for the customers. For example, the credit limit set for COF(C1) may be affected by payers 1 to N and/or an established credit limit for the payers, such as payer(PY1) which is a payer for a sold-to customer of the COF(C1) customer. At block 1104, an order is entered. At block 1106, it is determined whether a credit limit of the payer is exceeded. Factors such as risk category, next review date and/or credit limit may be considered. At block 1108, if the credit limit is exceeded, the order may be blocked and an order number created. At block 1110, blocked orders may be manually released. At block 1112, if the order is released, a delivery not may be created. At block 1114, billing may occur after the delivery note is created. At block 1116, if the credit limit of the payer was not exceeded, the credit limit of the central office customer, such as COF(C1) which sold to the payer, may be checked. At block 1118, if the credit limit of the central office customer is not exceeded, the order may be created, the delivery note may be created (block 1112) and the billing may occur (block 1114). Otherwise, at block 1120, if the credit limit of the central office is exceeded, the order may be blocked. Blocked orders may be manually released (block 1110).

Figure 12:
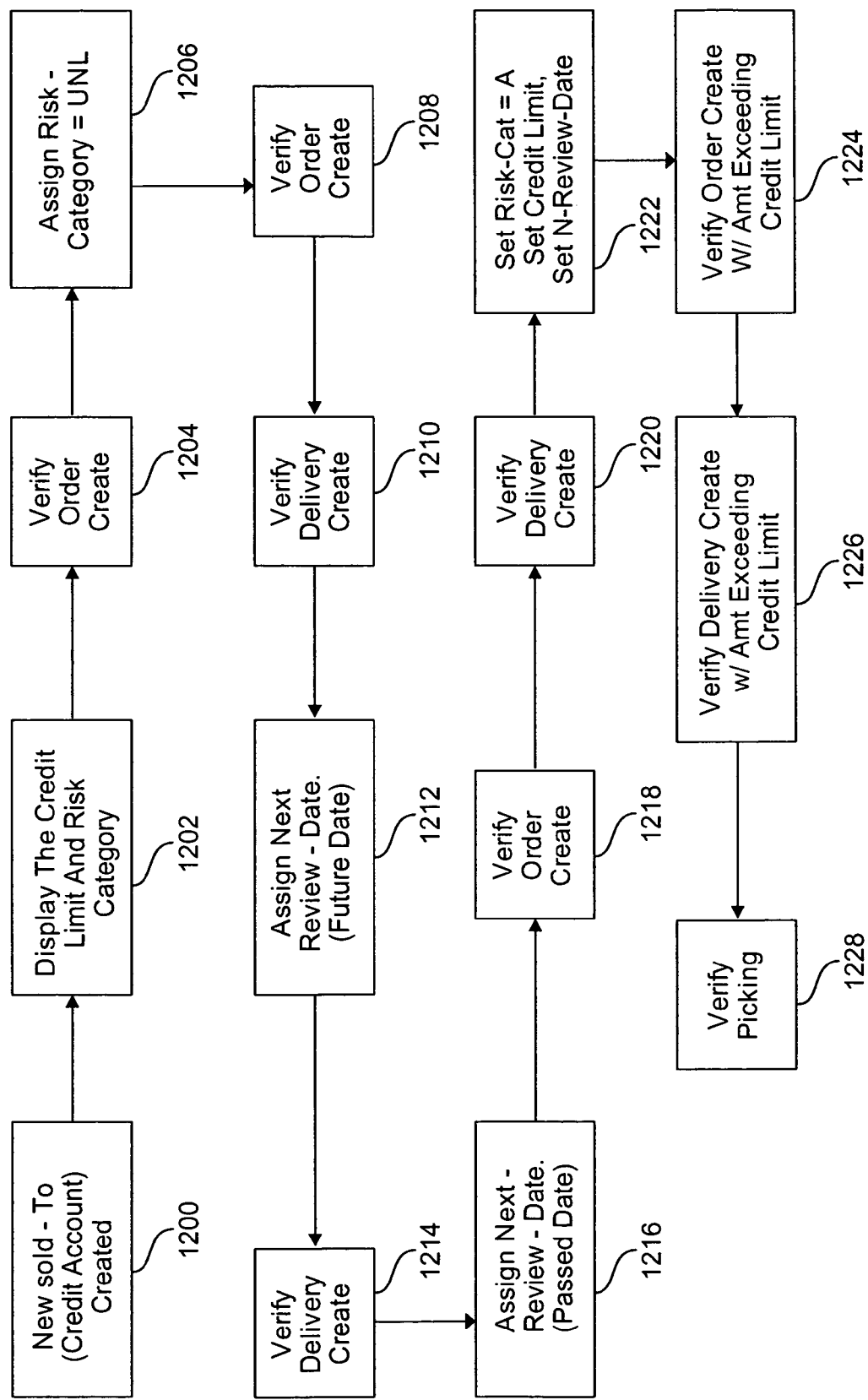
FIG. 12 is a flowchart illustrating an exemplary credit check for a new customer.

FIG. 12 is a flowchart illustrating an exemplary credit check for a new customer. At block 1200, a sold-to credit account may be created for the new customer. At block 1202, a credit limit and risk category may be displayed to the user. At block 1204, a created order may be verified. At block 1206, a risk category, such as unlimited (UNL), may be assigned to the customer. At block 1208, a newly created order may be verified. At block 1210, a delivery date may be verified. At block 1212, a next credit review date may be assigned. At block 1214, any delivery that occurred may be verified. At block 1216, a next review date may be assigned. At block 1218, a verify order may be created. At block 1220, a verify deliver may be created, such as after a lag time in processing. At block 1222, the risk category, credit limit and next review date may be set. The risk category may be set, such as to perform a dynamic check by using SAP standard code of 'A'. At block 1224, a verify order may be created with an amount exceeding the credit limit. At block 1226, a verify delivery may be created with an amount exceeding the credit limit. At block 1228, picking may be verified for different steps in the process where credit checking may be taking place, such as depending on a setting chosen for the customer.

The following is a general flow of what may follow from using the system and process described above. New customers may be handled by being defaulted to credit values that do not permit order entry. After Credit limit, Risk category are setup, an order can be created but NOT delivered. Delivery may be created after Credit Limit, Risk-category and 'Next-Review-Date' are set up. The user may create a new sold-to and assign the same sold-to number as the payer, bill-to & ship-to. A sold-to file may be created with default ship-to/payer/bill-to. The customer may be tied to a Credit Control Area and Central Office, if necessary. A customer's credit account may be displayed. The user may view the fields that determine the customer's credit standing. The user can view the customer's Credit Limit, Receivables, Credit Block flag, Risk Category, Credit Rep. Group, Last Review Date and Next Review Date. For a new customer, the Credit limit may be zero and the risk category may be NEW.

When creating a standard order, on an overview single-line entry screen, after clicking the save button, the order may not be created. The user may receive an error saying E: Dynamic credit limit exceeded. The user may be able to update the credit limit, risk category, and next review date at the same time or execute the scripts individually. Setting the customer's credit limit may be used to set both the individual payer's credit limit as well as the central office credit limit. The status field may be marked after entering relevant data and pressing enter. The customer's credit limit may be entered in the <Credit limit> field. This may set the upper limit for total receivable and the data may be saved.

In the same screen as above, the customer's risk category may be entered in the relevant category, such as <Risk category> field, and the data may be saved. A date of internal review may be set by credit manager. The credit manager may be alerted on the date set in this field to perform a credit check for the customer. The field may be reset every time the review date passes. If the users do not wish to set a date for the credit manager to review the customer's credit, a user can set the date very far in the future (e.g. Sep. 9, 9999). The order may be created at this time. A date of internal review may be set by the credit manager. This time the next review date back may be set to blank. The next review date may be removed. To create a delivery note, on the quantities screen after clicking the save button, the delivery may not be created. The user may receive an error saying E: Credit check: customer review date has passed.

The date of internal review may be set by credit manager. A delivery note may be created. The same sales order may be used for the last delivery create, in the prior steps. This time the delivery may be created. The date of internal review may be set by credit manager. This time the user sets the next review date to a date in the past, as an example that may be set in the system to show functionality of an error received when the date passes. Under normal operating conditions, this may not normally be done. After the date passes, the user may receive a warning saying that the next check is in the past. The user may continue by clicking the ENTER button. To create an order, such as with a manual input, with the create standard order of the process, an error may occur on an overview single-line entry screen after clicking the Save button. A user may receive an error saying Credit: customer review date has passed. In this case, no updating may be possible.

An internal review by credit manager may be set. This time around, the next review date may be set to a date in the future, therefore an update may be successful. The order may be created this time. The date of internal review may be set by credit manager. The time for the next review date may be set to a date in the past. The user may receive a warning saying that the next check is in the past. The user may continue by clicking the ENTER button.

On the Delivery Create, for the quantities screen after clicking the save button, the delivery may not be created. The user may receive an error saying E: Credit check: customer review date has passed. The user may set customer's credit limit to low. The user may set customer's risk category to low risk. The user may set date of internal review by credit manager and set the next review date to a date in the future. The three previous steps may all be executed on the same screen at the same time, or separately on separate screens, depending on an implementation.

The user may input a quantity so that the value of the order is greater than the credit limit. Order may be created without a warning or error. On the quantities screen after clicking the save button, the delivery may be created but the user may receive a warning first saying dynamic credit limit is exceeded. The delivery credit status may also be blocked. The user may enter the pick quantity on the deliver change. This procedure may assume that the storage location for the shipping plant is non warehouse management system (WMS) controlled. The process may be modified slightly if WMS has been implemented. The picking quantities may be updated on the Delivery Note without referring to any pick location. The Delivery status may be changed to "C" which may indicate that the delivery is completely processed.

The user may pick a delivery, without WMS, on the change delivery screen, instead of clicking the picking button, by click the packing button. The packing items screen may display an error stating that the delivery status only allows a display mode. A goods issue may be executed for a single delivery. On the delivery change screen, after clicking the post goods issue button, the user may receive an error on the display log screen stating that goods issue from delivery are not possible due to credit block—dynamic credit limit exceeded. This prevents the post goods issue from successfully processing. The user may release the order from credit block. Individual orders may be released without changing the customer's credit profile by using SAP transaction code VKM1. The user may select the order to be released, and click the button with an icon, such as a green flag. The credit block may be removed from the order such that the order is ready for further processing.

Expedite Orders

A basic functionality may be demonstrated for backlog management after the receipt of an expedite delivery order from the customer. The process may take place when a customer needs to receive an order sooner than expected, or make another change to the order. Expediting the order may improve the chances that a delivery is created for the order, which may in turn speed up shipping. The process may include finding and listing a referenced backlog item, determining the status of the item, and determining the required course of action for satisfying the customer's requirements. This process may include sources for finding current order information to assist the user in evaluating what actions may be required.

The process may be used by various users, such as credit managers, field sales, sales managers, customer service, distribution centers, product marketing, and product planning. The process may explain how to locate a customer order by sold-to, purchase order, material, or order number. Additionally, the process may show how to determine the production/shipping status of the backlog item. Steps to change a requested delivery date, delivery priority, delivering plant, partial shipment, ship-to location may be included by the process. The process may automatically create the delivery for an order/item, if required.

Depending on the business process, not all expediting options may increase the chance of a delivery document being created. For example, not all companies choose to utilize the delivery priority as part of backorder processing. In the semiconductor industry, foundry companies may focus more on manufacturing than research and development. So, sophisticated ERP manufacturing and planning linkages may need to meet the needs of their time dependent businesses. Since the majority of their business may be based on make-to-order scenarios, they may need additional tools to meet customer demands while recovering any additional costs necessary to reduce manufacturing lead times. Custom code may be recommended to meet the requirements of hot runs and super hot runs.

Customers may be continually requesting material to be delivered in under its published manufactured lead times. In these situations foundries may require the creation of an expedited order. Based on a delivery time field, a designation of hot run or super hot run may be selected at the item level. When each is selected the manufacturing lead time may be reduced, allowing the requested delivery date to be made sooner. The field change may also carry out new pricing which may increase the uplift charges associated to the line item. The decrease in manufacturing lead time as well as the increase in material price may be defined when the material is entered into the system or is individually negotiated with the customer.

Figure 13:
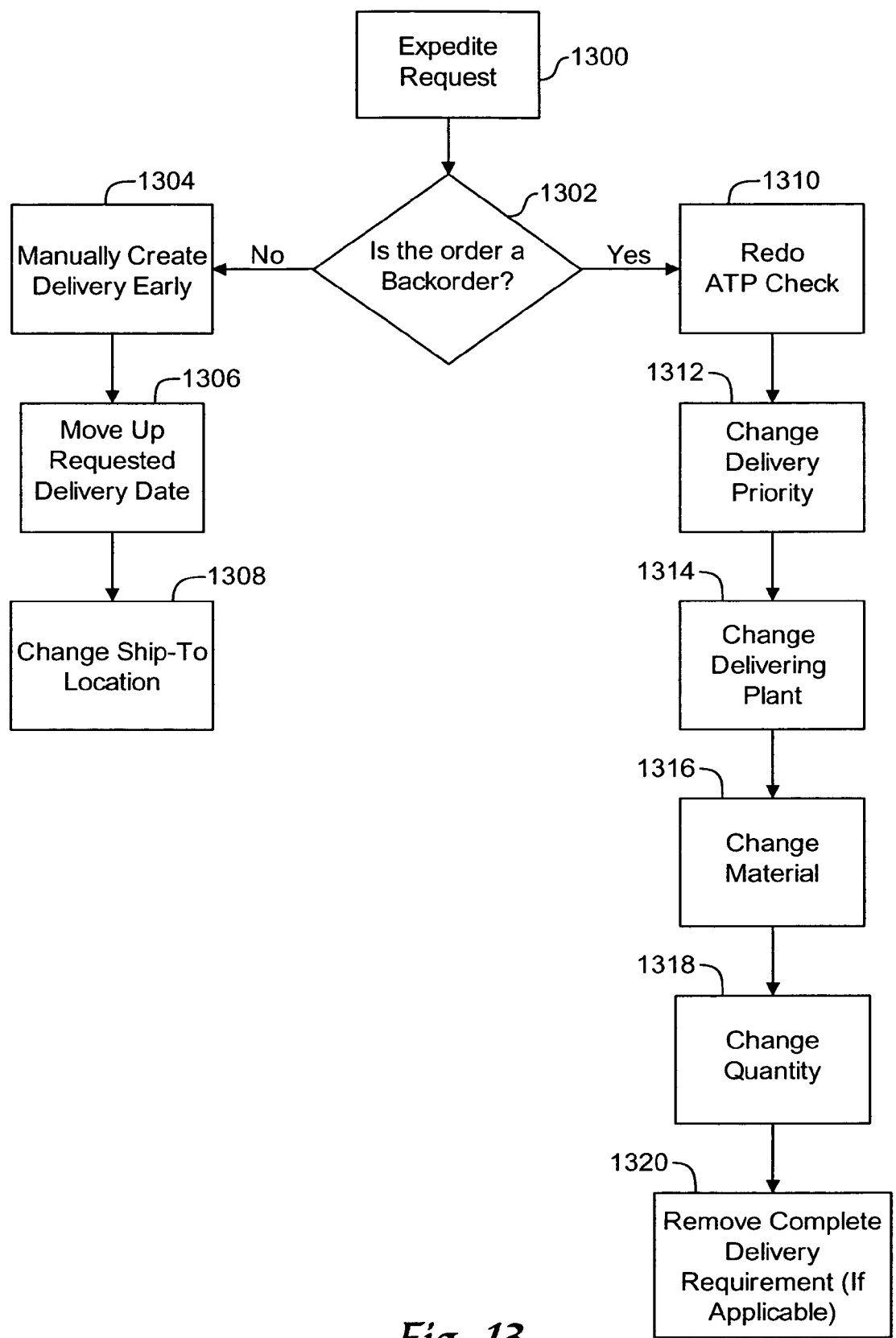
FIG. 13 is a flowchart illustrating an expedited request process.

FIG. 13 is a flowchart illustrating an expedited request process. At block 1300, a request to expedite an order may be received from a customer. The process may allow the user to determine the current status of a backlog items and attempt to make order revisions or take appropriate actions to achieve the customer's required delivery date. The process may address several of the more common reasons for a customer to expedite a shipment. In addition to the described process, other actions may be used to address other conditions such as exceeding credit limits, credit blocks, customer master blocks, customers on boycott lists, export license checks, and other similar reasons that may prevent shipment to the customer. There also may be other order conditions that impact order expediting, such as with regard to backorder described below.

At block 1302, the process determines if the order was backordered, e.g., the order is not in stock. To determine a current order status, sales order documents may be listed by a sold-to, ship-to, material, or Purchase Order number. Using the available information, a transaction may be used to search for the appropriate order. After finding the order, a details button, such as from a tool bar, may be used to review the displayed information such as organizational data, partner functions, or other selection criteria. The user may double click on the order to access the order is display mode. An order may be displayed to view materials, quantity, prices, business data, and partner data of an order. Once the sales order number is input, the sales order information may be displayed. If the order is delayed, the reason may be investigated during this transaction. A useful screen may be at the item level. A schedule lines tab may be used where the result of the ATP check is displayed and can be researched, such as by using a 'check item availability' button.

The plant stock availability may be checked to determine material availability for meeting customer requirements. Inputting the material number may provide the plant and storage location of the material that is available. This process may be performed to determine whether or not a specific plant has the necessary stock to fulfill a customer order. Transactions may also be used to review Available to Promise (ATP) inventory. The user may determine what material is in transit to the warehouse. Using the internal part number, a list of the purchase orders with that part number may be displayed. A search may be performed for a specific plant for all plants if this field is blank.

At block 1304, is the item is not backordered, the user may manually create a delivery entry. Creating early delivery may cause an early shipment/pull ahead for a delivery that was created for a sales order scheduled in the future. If there is a business need to ship ahead certain sales order/line items previously created, this function may be used. At the time the delivery is created, a delivery note may be issued. At block 1306, the user may then move up the delivery date, such as based on the customer's request. The user may input the selection date, the shipping point, and the sales order. A delivery number may be provided. This action may require business approval. At block 1308, if necessary, the user may change the ship-to location.

At block 1310, if the order is backordered, the user may perform another ATP check. In addition, other action may be performed to try to support the customer requirements. At block 1312, the delivery priority may be changed to a higher delivery priority to allow a larger pool of inventory to be considered. At block 1314, an alternative plant delivery location may be selected, which may help to expedite the order. Reviewing stock levels using SAP transaction code MMBE and CO09 can inform the user of possible alternate plants for the order. Using the drop down menu from inside the plant field may display the maintained plants for a line item. Changing the plant may re-trigger ATP. At block 1316, the material may be changed to try to help expedite the order such in the case where an alternate material has been identified after talking with the customer.

At block 1318, the user may change the quantity by authorizing a partial shipment for an order item, such as if permitted by the customer. A field may be used for the user to indicate whether or not a partial shipment is acceptable for a line item. The user may ship an available quantity as a partial delivery/partial shipment. Picking may involve preparing goods of the correct quality in the correct quantity for shipping on schedule to a customer. Picking may be carried out separately for each delivery. This function may allow part of a delivery to be sent to the customer if the full delivery is not available. The second pick may occur once the materials are available to satisfy the full order quantity. At block 1320, to accomplish the partial delivery, a requirement for a complete delivery may be removed, if applicable.

A shipping carrier on an order may be changed. A carrier change may be made for material that is to be delivered at some future date, on a specific item shipment only, without altering any of a customer's standard shipping instructions. This may be adjusted using the forwarding agent/freight forwarder partner function. The user may change the ship-to partner at header or item level. The ship-to partner may be changed at the customer's request. This may be done for individual items or at the header level so that it may be applicable to the entire order. The customer requested delivery date may be changed if the customer needs it to be modified. This may be adjusted using the 'First date' field if the change is for only a specific line item. The user may use the 'Fast change of' field if all line items are changing. The header level Request Delivery Date (RDD) may not copy down to the line items. Changing the RDD may automatically re-trigger ATP. For an urgent ship request, the shipping condition in an order may be changed. The schedule may be recalculated according to the new shipping condition. In addition, a delivery plant location may be changed for an item within an open order for multiple items. The plant, shipping point, route, and storage location may also be changed.

Partner Determination

Partner determination features, such as for an SAP system, are discussed. Partner determination may identify and assign different partner functions to document types and account groups. When a document or customer is created, the procedures which have been assigned may identify the partner functions that may be mandatory and optional for each of the areas. By using Partner Determination, a user may define what business partners, such as Ship-to, Bill-to, Field Sales etc., may be included in each sales document or customer record, such as Sales Order, Delivery etc. Also, a user may define what partners are connected to the business partner itself. What partners are entered on the partner view when a user creates a new business partner in the customer master may be determined by partner function.

Figure 14:
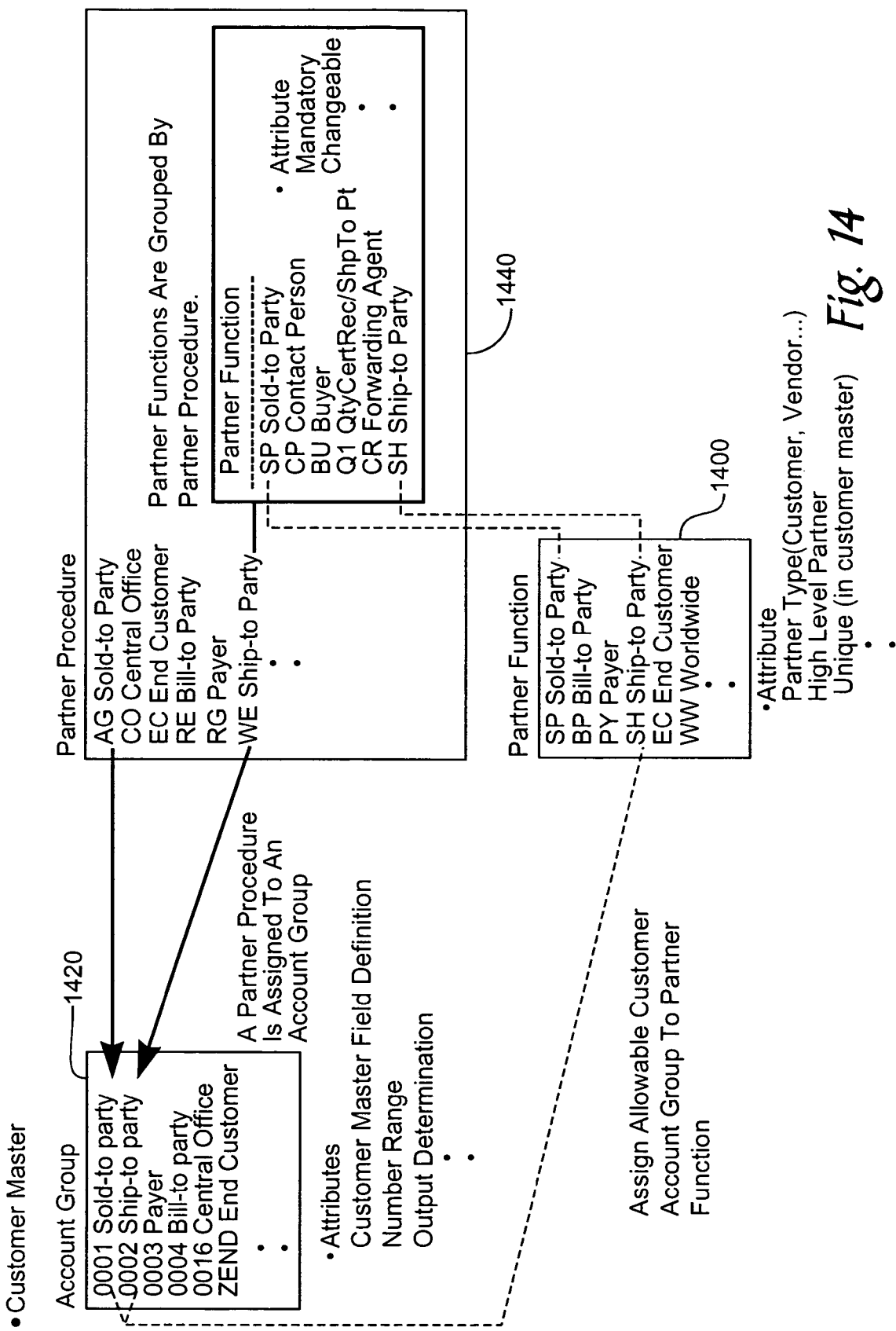
FIG. 14 is a block diagram showing a process for partner determination.

FIG. 14 is a block diagram showing a process for partner determination. Partner determination may include the following steps. First, at block 1400, a partner function field may be established to distinguish between the functions of partners. A user may define partner type, e.g. customers, vendors, customer's employees or a user's employees, higher-level function to define dependencies between partner functions, and whether or not the customer is unique in the customer master, etc. The customer master is a section within SAP that may hold all sales related persons that the company does business with. Within the customer master business partner functions may be assigned that classify the data that is entered by identifying it, such as ship to location, bill to, sales representative, etc. A user may also assign customer account groups to the partner function. In this way, a user may limit allowable customer account groups for the partner function.

Second, at block 1410, a user may group partner functions which are allowed for a partner object in a partner determination procedure. A user may allocate the grouped partner functions to the keys of the respective partner object. A user may also define a partner function attribute in the partner determination procedure, such as 'mandatory partner', 'changeable partner' and etc. Third, a user may assign partner determination procedure to the key of the respective partner objects. Available partner objects and their keys may include the following:

TABLE 1

| Partner Object | Key |
| --- | --- |
| Customer | Account group |
| Sales doc. header | Sales document type |
| Sales doc. item | Item category - sales document |
| Delivery header | Delivery type |
| Shipment header | Shipment type |
| Billing doc. header | Billing document type |
| Billing doc. item | Billing document type |
| Contact | Contact type |

At block 1420, allowable customer account groups may be assigned to partner functions. A partner procedure may be assigned to an account group. In this way, a new partner function and procedures may be defined for the customer account group which a user creates. Also, business partners may be created in the customer master.

Figure 15:
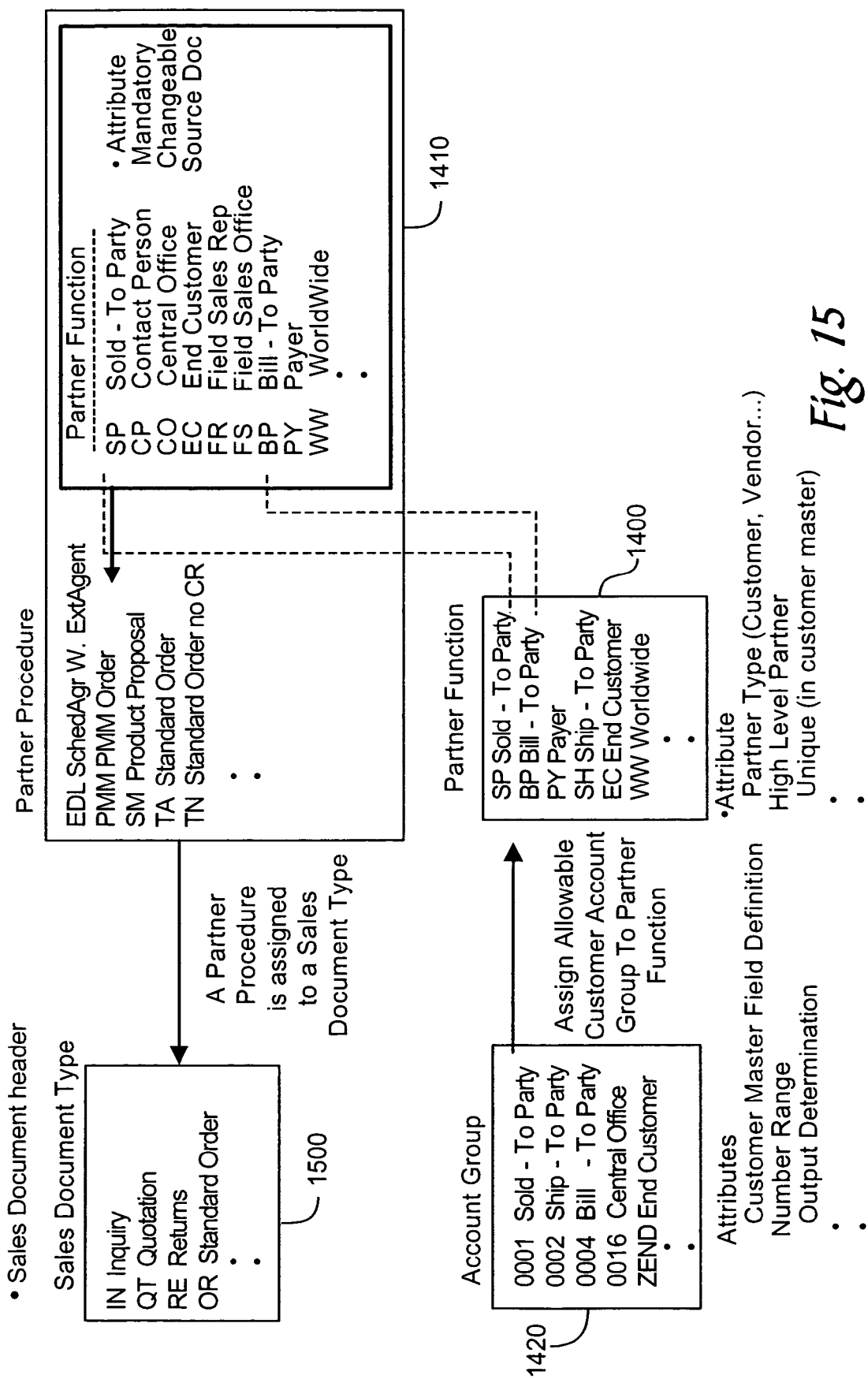
FIG. 15 is a block diagram of an exemplary sales document header.

FIG. 15 is a block diagram of an exemplary sales document header. The customer account group 1420 may be assigned to the partner function 1400. At block 1500, the partner procedure 1410 may be assigned to a sales document type, such as inquiry, quotation, returns, standard orders, etc.

Figure 16:
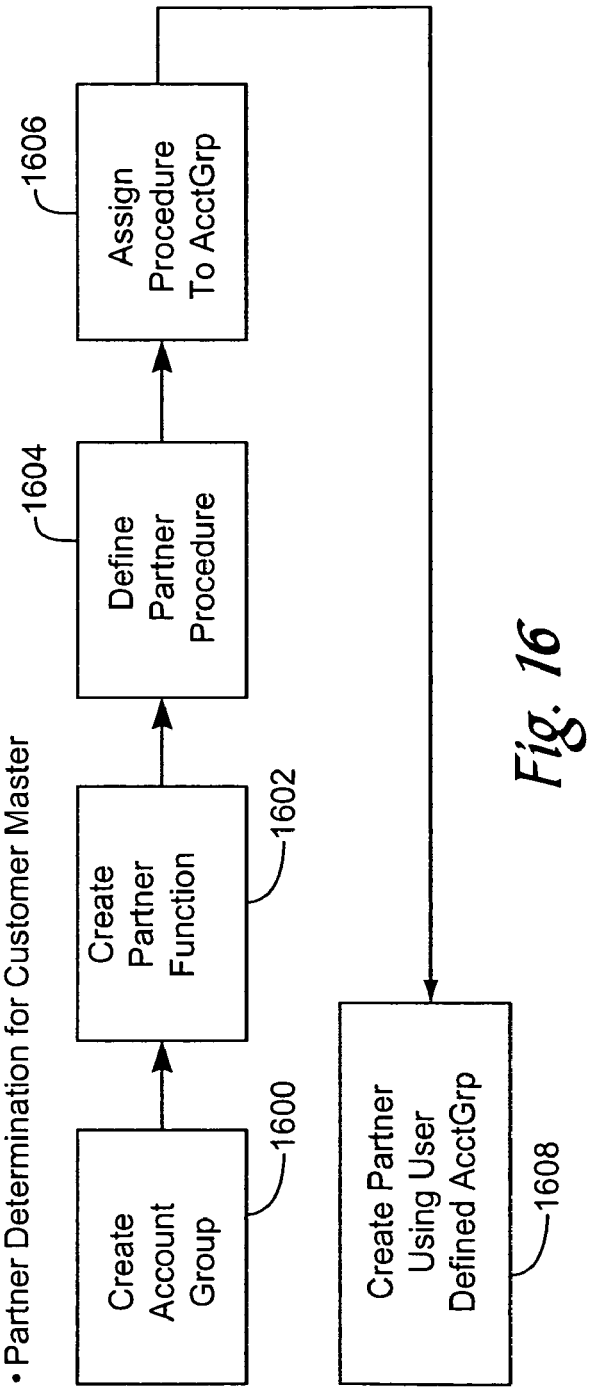
FIG. 16 is a flowchart illustrating partner determination for a customer master.

FIG. 16 is a flowchart illustrating partner determination for a customer master. The following steps may represent the general system flow of the partner determination process. At block 1600, a customer account group may be created. The account group may be a classifying feature within customer master records which is assigned at the beginning of the partner determination procedure. The account group may determine which number range the customer account number should be, whether the number is assigned internally or externally, and which fields may be necessary, or possible, to be filled out in the master record. A user may also define the text determination procedure and a type of pricing which is used with that master record.

A number range may be defined for a customer account group. When creating a customer master record, a unique number which identifies the master record may be assigned. The number may come from the number range that is provided for the account group. There may be two types of number assignments, internal and external assigned numbers. Internally assigned numbers may be used, for example, such that SAP can manage the sequence. Number ranges may be set up with two separate ten digit numbers that do not overlap other number ranges. A different number range may be used for each of a user's different customer types so that users can identify the type by the range that is used. In the semiconductor industry, three account groups may be used for customer creation. The standard account group may be used for domestic, international customers, distributors, and end customers. The account group CPD may be used for one time customers. A special inter-company account group (ZINT) may be set up for inter-company customers.

At block 1602, partner functions may be created. Partner functions may be objects that specify the relationship, for example, the function or responsibility, which the holder of the role has to the appropriation request. The standard SAP partner functions, such as sold-to party, bill-to party, or payer, for example, may be supplemented with further user-defined partner functions. In the semiconductor industry, additional partner functions may be used in other to provide further information. Other companies may add the following partner functions to the sold-to partner determination procedure: Field Sales Representative (FR), Field Sales Assistant (FA), and Carrier (Freight Forwarder) (CR). These partner functions may be listed as optional on the Sold-to record. These partner functions may be linked to the Sales Document Header, the Customer, and the Billing document, as necessary.

The ability to track distributor end customer sales may be customized and a partner function of (EC) may be used. The distributors may need to include the end customer's information in pre-established fields so that when information is sent the system can make the association or create a new EC customer record. The customer record may also be connected to the appropriate customer hierarchy. An end customer sales office may then be attached to the EC partner function. The last partner function may be the function used during Cross Dock (CD). The partner function may be added to a sales order when a material is going to be sourced from a plant outside the country and the material does not return to the originating sales order country before being shipped to the end customer. The partner function may be connected to an output determination so that additional documentation may accompany the materials when they are sent to the customs location.

The Cross Dock partner function may allow for a vendor to be set up to act as the cross docking agent. The vendor may be no more than the address of the customs location and may not have the full functionality of a full vendor. Therefore, a separate vendor account group may be created in order to accommodate this. The customized vendor group "ZRCD" may be linked to the customized partner procedure for cross docking "CD" as well as the customized partner function for the cross docking address "CD". The partner function "CD—Cross Dock Address" may be linked to the Sales Document Item, Delivery, and Billing document header.

At block 1604, the user may create a partner determination procedure. Partner determination procedures may summarize all partner functions that are allowed for a partner object in a partner determination procedure. A user may then assign a partner determination procedure to a key. The partner functions contained in the determination procedure may then be relevant in the record type to which they have been assigned.

At block 1606, the user may assign partner determination procedure to the customer account group. By assigning the partner determination procedure to the customer account group, the associated partner functions and mandatory field entries may be displayed when the customer is created. All customers may need to have an account type selected when they are created to define required fields and assign the appropriate general ledger accounts. At block 1608, a partner may be created using a defined account group.

Figure 17:
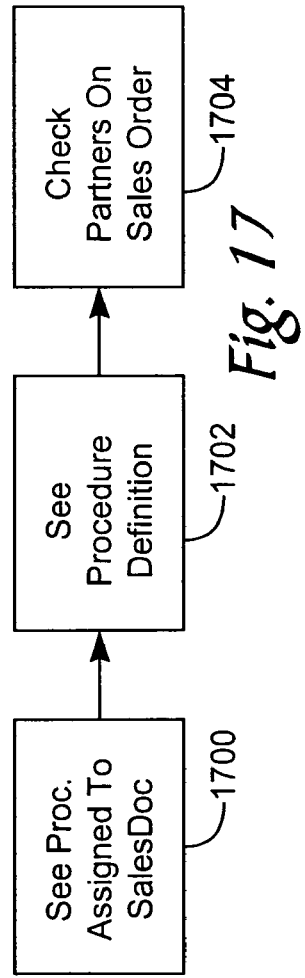
FIG. 17 is a flowchart illustrating partner determination for a sales document header.

FIG. 17 is a flowchart illustrating partner determination for a sales document header. Partner functions may be created. The partner functions may be objects that specify the relationship, for example, the function or responsibility, which the holder of the role has to the appropriation request. Standard SAP partner functions, such as sold-to party, bill-to party, or payer, for example, may be supplemented with further user-defined partner functions. A partner determination procedure may be created. The partner determination procedure may summarize all partner functions that are allowed for a partner object in a partner determination procedure. A user may assign a partner determination procedure to a key. The partner functions contained in the determination procedure are then relevant in the record type to which they have been assigned. The standard TA (standard order) procedure may typically be used for sales orders.

A partner determination procedure may be assigned to the Sales Order Header. At block 1700, the user may view a procedure assigned to a sales document. At block 1702, the procedure definition may be viewed by the user. At block

1704, the user may check the partners on the sales order. By assigning the partner determination procedure to the sales order document type the associated partners functions and mandatory field entries may displayed when the customer is created. The procedure may define the mandatory partner functions for each document as well as allowing the inclusion of optional partner functions such as for a sales representative.

Inter-Company Pricing

This demonstrates a billing procedure that may be used for inter-orders company orders of semi-finished and finished goods. A general process of creating an invoice is discussed as well as two processes that may be used for inter-company pricing. The procedure outlined may be used mainly for orders that involve two or more company codes. In the semiconductor industry, the calculation process that is used may be determined by the unique combination of the Seller, the Buyer and the good being sold, and may be either the "Cost-Plus" Method or the "Resale-Minus" Method. The process may be used by business planning and financial control users.

Inter-company pricing in SAP may be customizable. The pricing procedures used may be configured to meet very detailed requirements of different countries and organizations. The general process used for inter-company billing, regardless of the customization used, may be as follows. The delivering plant may process the delivery to create an inter-company billing document (such as type IV) for the selling company. The company code may post the invoice entry for the billing document. The billing document may be automatically billed to the internal payer that is assigned to the sales organization. The inter-company charges that appear in the inter-company billing document may represent the actual amount that the delivering plant is charging the sales organization. In standard SAP, this amount is derived from one of two default condition types: P101 Inter-company (fixed amount per material unit) or P102 Inter-company (percentage of the net invoice amount). These condition types specify that the price charged by the delivering plant to the sales organization is shown as a statistical value in the sales order and an effective charge in the internal invoice. These condition types may function in the same manner as normal pricing conditions and may be maintained in the Sales and Distribution (SD) pricing master data screen.

In the semiconductor industry, pricing conditions may be highly customizable. This process may demonstrate a pricing procedure that is recommended for the semiconductor industry that is referred to as ZINTER. ZINTER may include two methods of pricing: Resale-minus pricing and cost-plus pricing. The entities concerned are mainly Wafer Fabrication plants, A/T plants, and DC/Sales Organizations.

A ZINTER pricing procedure follows. An inter-company sales order may be priced according to two methods: Cost-Plus or Resale-Minus Pricing. The Cost-Plus method may use the base price of the good, and marks it up by the amount specified in the profit factor condition type. This may be used mainly for semi-finished goods. The Resale-Minus Pricing method may take the Resale Price and reduce it by the amount specified in the profit factor condition type. Entities in Japan may use only resale pricing. Which pricing method is used may depend on the unique combination of seller, buyer and good. When a sales order is entered that contains two internal customers, the system may automatically recognizes it as an inter-company order, type ZICT. The system may then determine which condition type to use, depending on who the buyer and seller are, and what type of good is being transferred. The following table explains the different condition types that may be configured.

TABLE 2

| Step | Condition type | Explanation |
|---|---|---|
| 1 | ZICT | Inter-company Condition Type, whether it is Cost Plus or Resale Minus |
| 100 | ZCWC | Cost + Wafer/Chip |
| 250 | | Wafer/Chip Cost Plus Price |
| 300 | ZCFG | Cost + SFG/FG from A/T |
| 350 | | A/T SFG/FG Cost Plus Price |
| 400 | ZRFA | Resale SFG/FG Asia |
| 450 | | A/T Resale Minus Price |
| 500 | ZPRS | Standard from Material Ledger |
| 510 | ZMAF | Moving Average Factor |
| 520 | | Raw Materials at Standard [Equal to ZPRS + (ZPRS * ZCCC)] |
| 600 | ZCDC | Cost + FG from DC |
| 650 | | DC Cost + |
| 700 | ZRFJ | Resale SFG/FG Japan |
| 800 | | A/T Resale Minus Price |
| 900 | ZBAS | Base Price |

After the system has determined which condition type to use, it may select a special profit factor pricing condition depending again on the unique combination of good, seller and buyer. The profit factor conditions available may include ZAAA, ZBBB, ZCCC, ZDDD and ZEEE. These conditions may be maintained in sales and distribution (SD) and fed into the Pricing Module. In general, the condition type may be drawn from the buyer/seller level, and the profit factor may be drawn from the material level.

The calculations that may be entered in configuration are demonstrated below:

CLAM: Cost Less all Materials
CLC: Cost Less Chip
FERT: Finished Good ready to sell to a Trade Customer
HALB: Unprobed Wafer, CHIP, Non-Turnkey Finished Good
LOAD: Can be loaded from an external source or as a manual load directly to the SAP pricing Module
MPG: Material Pricing Group
OM: Other Material
OTC: Operational Transfer Cost (Material Ledger Standard from the Shipping Plant)
SBE: Strategic business entity (worldwide business)
SOF: State of Finish. A SOF material may be a device that had not been fully built. For example, it may be a device that has been assembled, but not tested.
Cost+Actual Invoice Price (AIP)
Chip Interface: Wafer AIP/Chips per Wafer/Multiprobe Yield=Yielded Chip AIP.
Chip Interface: Yielded Chip AIP+(Yielded Chip AIP*profit factor ZAAA)=Chip Cost+AIP.
A/T Chips: Yielded Chip AIP (derived from wafer fab source)=A/T Chip AIP.
A/T Chips: Yielded Chip AIP+(Yielded Chip AIP*profit factor ZAAA)=A/T Chip Cost+AIP.
A/T SFG/FG: (Assy Yield*Test Yield)=A/T Yield Loss.
A/T SFG/FG: (Assy AIP Cost Less All Materials+Test AIP CLAM)=A/T Cost Less All Matl AIP.
A/T SFG/FG: (Assy AIP OM+Test AIP OM)=A/T All Other Material AIP.
A/T SFG/FG: Assy AIP CLAM+Test AIP CLAM+Assy AIP OM+Text AIP OM=A/T Device CLC AIP.
A/T SFG/FG: Wtd Avg Chip AIP/(Assy Yield*Test yield)=Yielded Wtd Avg Chip AIP.
A/T SFG/FG: (Wtd Avg Chip AIP)/(Assy Yield*Test Yield)+(Cost Less All Matl AIP)+(Cost Less All Matl AIP*Assy Test Factor ZATF)+All Other Matl AIP=A/T Device Cost+AIP Assumptions: SOF devices may be fed the pricing module with the appropriate fields.

Example: Test CLAM and Test OM is fed with 0.00 and Test Yield is 1.00 for −ASY devices that have not been tested.

DC FERT: Wtd Avg Chip AIP+Wtd Avg CLC AIP=Wtd Avg Device AIP

DC FERT: (Wtd Avg Device AIP+Finishing Cost Adder+Misc. Adder+Duty Adder)/Yield=FERT Device AIP Std (COB-AIP)

DC FERT: FERT Device AIP Std+(FERT Device AIP Std*Profit Factor ZBBB)=FERT Cost+AIP Resale AIP 1 (Resale Price Factor set at the Buyer Plant Level)

FERT: AUP (Average Unit Price)+(AUP*Price Factor ZBBB (Usually negative))=Device Resale AIP 1

Resale AIP 2 (Resale Price Factor set at the Buyer Plant/Seller Plant/MPG (Material Price Group) Level)

FERT: AUP (Average Unit Price)+(AUP*Price Factor ZCCC (Usually negative))=Device Resale AIP 2

Assumptions: Resale AIP 2 may be used by regions that are required by government authorities to separate resale AIP factors by the Seller and the WW DC.

In order for the system to process an inter-company sales order, every internal customer, for every plant and sales organization, may have one of the above pricing procedures specified in their customer master record. Each customer may also have the customer pricing procedure (Cust.pric.proc.) field set to 'I' (for inter-company). This function may be performed in the update customer master transaction (XD02).

The following are three examples to demonstrate logic of the pricing procedure, for example, in the semiconductor industry:

Example A

Company X (Plant 1234)) buys finished goods from various A/Ts that use the Resale-Minus-Method such as Company X-Malaysia, Taiwan or Philippines. 1) ZICT may be to "450" for the buying plant. This may ensure that all the inter-company purchases by this buying plant are via the Resale-Minus Method. Notice that the buying plant (2000 or 3000) may represented by an internal customer number. It is noted that if plant 2000 always buys with Resale Minus regardless of the seller, ZICT may be set up at the 'buyer' level. However, if plant 2000 buys from USA via the Cost-Plus method, we need to set-up ZICT=350 at 'Buyer & Seller' level. The system may always look for the more specific record (by buyer & seller) first. If it cannot find this record, it may retrieve the more generic record (by buyer only). This 'Condition technique/Access sequence' method may be deployed in many areas of SAP. 2) A Resale-Factor (ZRPF) may be set up for the buying plant. (E.g. Minus 5%). 3) The AIP price may be loaded in the Pricing Module. This may then feed pricing condition ZRFA. When plant 2000 (or 3000) buys from any of the A/Ts (or DCs from other regions), the system may recognize that the Pricing-Method is "450", and use pricing condition ZRFA.

Example B

A US entity buys finished goods from Company X-Malaysia, Taiwan or Philippines at Cost Plus Method. 1) ZICT may be set up as "350" for the buying plant (Plant #6000). The system may be customized to recognize "350" as inter-company price: Cost-Plus Method. 2) An A/T mark-up factor (ZATF) may be set up to represent the mark-up the A/T needs to make. 3) The Cost+price may be loaded in the Pricing Module. This may then feed pricing condition ZCWC. When USA (Plant 6000) buys from the A/T, the system may recognize that the price method is "350", and thus use pricing condition ZCWC.

Example C

A/T (Plant 4000) buys wafer from Tokyo W/F at Cost-plus method. 1) ZICT may be set up as "250" for buying plant 4000. 2) A mark-up or cost plus factor (ZEEE) may be set up for Tokyo W/F. 3) The Cost+AIP may be loaded in the Pricing Module. This may then feed pricing condition ZCWC. When A/T buys wafers from Tokyo W/F, system will use pricing condition ZCWC.

Figure 18:
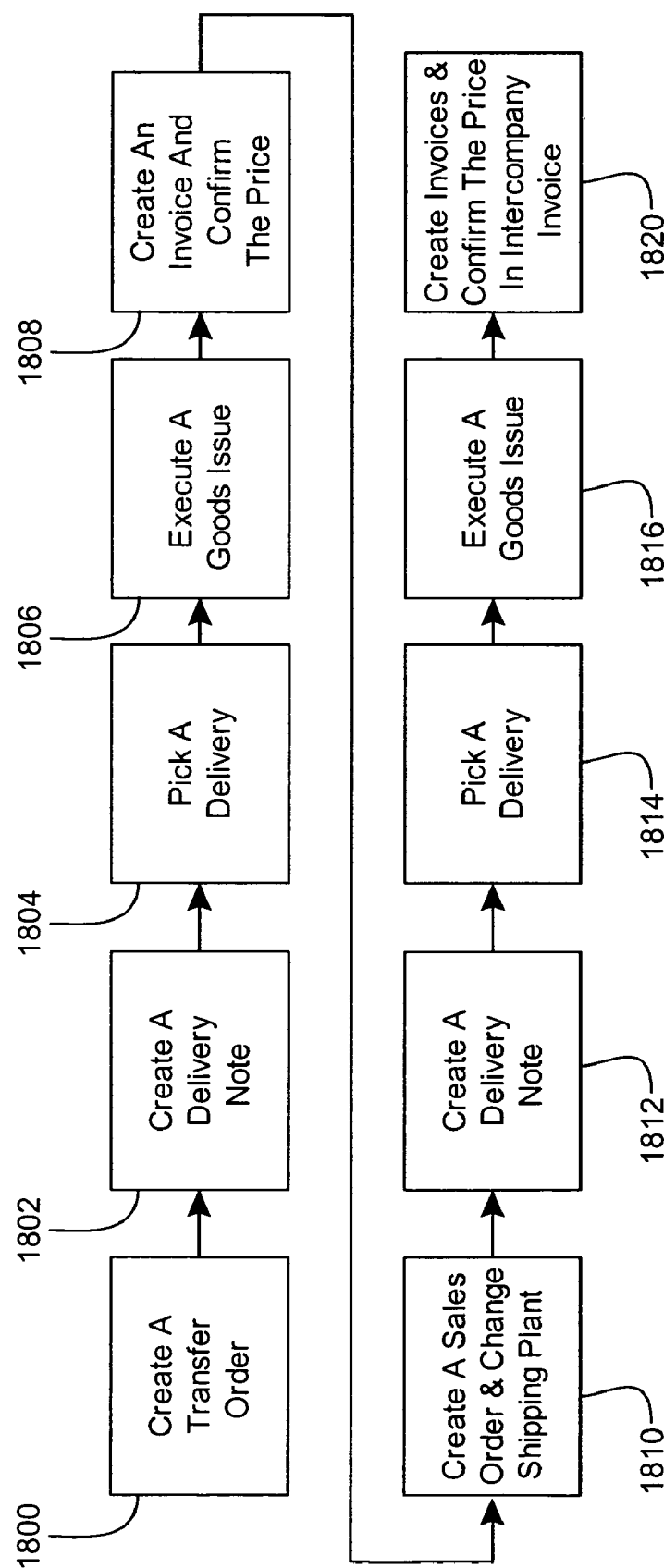
FIG. 18 is a flowchart illustrating a potential process for intercompany pricing.

FIG. 18 is a flowchart illustrating a process for inter-company pricing. At block 1800, a transfer order may be created. At block 1802, a delivery note may be created. At block 1804, a delivery may be picked. At block 1806, a goods issue may be executed. At block 1808, an invoice may be created and a price may be confirmed. At block 1810, a sales order may be created and a shipping plant may be changed. At block 1812, a delivery note may be created. At block 1814, a delivery may be picked. At block 1816, a goods issue may be executed. At block 1820, invoices may be created and the price in inter-company invoice may be confirmed.

A key data may be organized as follows:

TABLE 3

| Data Name | America | Asia | Europe | Japan |
| --- | --- | --- | --- | --- |
| Sales Org | | | | |
| Buyer | | | | |
| Selling Plant | | | | |
| A/T Material | | | | |

With the condition records setup, inter-company pricing between various Company X entities may be performed. The following steps represent a general system flow of the inter-company pricing. Condition records may be created. Pricing condition records may be maintained in SAP transaction code VK11. The condition record may be setup by selecting the desired inter-company condition record, specifying an entity for which the condition record is created, and entering relevant pricing data.

The following may demonstrate how to set up the condition records described above for a semiconductor company. The following three scripts or business scenarios may be applicable to all A/Ts which sell to some or all of their internal customers at the Cost Plus method. The ZICT must be set to 250. Condition record ZICT may be created and inter-company price type 250, 350, 450 may be set for a buyer key combination. In this script, the more general access sequence (key combination) "Inter-company Pricing Method by Buyer" may be specified. The pricing methods may include:

250: Cost-Plus Prices computed: ZWFR*ZBBB. (For W/F Plant)

350: Cost-Plus Price computed: (ZCLM*ZAAA)+ZCHP+ZAOM (For A/T Plant)

450: Resale-Minus Price computed: ZAUP*ZRPF (For DC, Sales Org)

In setting up ZICT, it may be important to only use one of these values and only these values for the rate. Otherwise, SAP may not be able to determine which pricing method to use. From a Create Condition screen, ZICT may be entered for the condition type and an enter key may be pressed. From the list of key combinations, the option of Inter-company Pricing Method may be selected by a Buyer. The valid From/ to, Customer, Material and Rate fields may be completed. The Rate may be the pricing method and may be 250, 350, or 450 as described above. Condition Record ZICT Inter-company price type 250, 350 and 450 may be created.

For a Seller/Buyer Key Combination, the steps to create the condition record may be the same as for the buyer level, except 'Inter-company Pricing Method by Seller/Buyer/Material type' may be chosen for the Key Combination. Condition Record ZICT may be created. A wafer Fabrication cost-plus plus factor script may describe how to create a wafer cost condition record for a particular wafer fabrication. In the Create Condition screen, ZWFF may be entered for the Condition Type. The Valid From, Valid To, Plant and Rate fields may be completed. The Rate may be determined as a markup percentage of 5%

The following two scripts may be applicable to all A/Ts which sell to some or all of their internal customers at the Cost Plus method. The ZICT must be set to 350. ZICT inter-company price Type—250, 350 or 450 may be created. The process may be repeated as described above, using Condition type ZICT and Key Combination Inter-company Pricing Method by Buyer. ZATF A/T Cost Plus Factor (%) may be created. This script may assume that the mark-up percentage (e.g. Cost Plus Factor) for a given selling plant is the same for all products. ZATF may be entered as the Condition type and the Valid From/to, Plant and Rate fields may be completed. The rate may be the percentage markup of a given good.

The following two scripts may apply to all DCs and Sales Organizations which may buy with the Resale-Minus method. The ZICT may be set to 450. ZICT Inter-co price types 250, 350 or 450 may be created. A ZRPF script may be set for Resale Price Factor. The script may demonstrate how to set up a Resale Price Factor for a buying plant. In one configuration, the factor may be used to multiply the average trade invoice price of the same material to derive the inter-co price. The same factor may be used for the entire plant regardless of material. This may be maintained by the Finance people in the buying plant who use 'Resale-Minus method'.

It may be assumed in this script that a different state of finished (SOF) such as Turnkey versus Non-Turnkey are using the resale factor. Should the need arise to use a different factor for different SOF, the factors may be set up in similar manner as the 'VALUATION CATEGORY' function is turned on. The valuation Category may be a field in the material master use to differentiate SOF. ZRPF may be entered in the Create Condition Screen and the user may click Enter. The Valid From/To, Customer and Rate fields may be filled in. The Customer may be established as the buying plant, and the Rate may be the factor indicating that, when this plant makes a purchase, the inter-company price is equal to the Average Invoice Price (ave.invoice.prices) multiplied by 0.5.

The following scripts may outline a process for creating and processing an inter-company order. The scripts may also show how to validate a price/pricing procedure. Inter-company Transport Order may be created. The stock transport order may trigger the movement of material/goods from one plant to another between company codes. A request is generated that may post a delivery requirement against the supplying plant. When viewing the Stock Overview, the On Order quantity for the requesting plant may be incremented. The StckTrsptOrdRel quantity may be incremented for the supplying plant.

A delivery note may be created for a transport order, such as inter and intra-company. The Shipping point field may be completed and the checkbox marked for Stork Transports under 'Documents to be selected'. A disp. del. due list button may be clicked. A box beside the "Review & Select the Stock Transport Orders for Delivery Processing" line may be checked. The Deliveries button may be clicked to view the order and delivery numbers. To pick a delivery, the delivery number may be entered and the Picking button clicked. The quantity to be picked may be entered and the save button clicked. To execute a goods issue for a single delivery, the delivery number may be entered and the Post goods issue button clicked. To create an Interco Billing first for a Cross-Dock shipment, the delivery note number may be entered for the crossdock sales order and the Default Data button clicked. Billing type IV may be selected and the continue button clicked, then the script may be Executed. When a user reaches the Inter-company Billing (IV), an overview of Billing Items screen may be created, and the user may select a line item and click on the <Pricing> button. The user may then be able to check the pricing calculation in the Inter-company Billing (IV) Create, such as via the Item Conditions screen.

The following scenario may occur for semiconductor companies posting inter-company invoices when creating a sales order that crosses company codes. SAP may be configured to create two invoices for international orders: one invoice for the customer, and one inter-company invoice that may be sent to the sales organization/plant that is based in the customer's region.

The process for changing the order may be as follows: An order may be created. A delivery plant may be changed at item level. The Order field may be filled with the order number and the user may click Enter. The user may select the line that the user wants to change and select Goto=>Item=>Shipping. The user may change the Plant by overriding the field with any plant number the user needs. The user may change the Shipping Point field to reflect the value set in the Plant field. The user may change the Route and Storage Location if needed. A delivery note may be created and a delivery picked. The user may execute a goods issue for a single delivery. The post goods issue transaction may be performed after a delivery is completely prepared for shipping. This transaction may update the inventory and initialize the required financial postings.

The user may create a single invoice for trade sales and an inter-company invoice using the same delivery note. The user may display and verify that two invoices are created in direct ship (trade & Inter-Co). The user may complete the Order field and select Environment=>Document Flow. The user may select the Inter-company Invoice line and click on the Display Document button. The user may select the desired item and click the Pricing button. The user may check the price calculated and the conditions used.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, is apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A computer implemented method for cross-dock and direct shipment processes, the method comprising:
    entering, on a computer, an order to ship inventory from a default plant of a selling organization to a customer;
    changing the default plant on the order to a new plant of the selling organization, wherein the new plant is located in another country which is a same country as a destination country of the customer but a different country than the default plant of the selling organization;
    entering a cross dock partner function to reflect an address of the new plant in the destination country, the cross dock partner function being used by the selling organization to process the order and output sales documentation for the transfer of inventory from the default plant of the selling organization to the new plant of the selling organization;
    conducting an inter-company transfer of the inventory from the default plant to the new plant, such that the inventory passes through customs inter-company before being shipped to the customer; and
    processing the order on the computer wherein the default plant, not the new plant, is displayed to the customer as a shipping plant.

2. The method of claim 1 further comprising creating necessary inter-company inventory invoice documentation in accordance with the processed order.

3. The method of claim 2 wherein the invoice documentation comprises a master commercial invoice and a master content list.

4. The method of claim 1 wherein the inter-company transfer reduces freight costs, importation taxes and documents required for export processing.

5. The method of claim 1 wherein the direct shipment comprises shipment of goods directly to the new plant.

6. The method of claim 1 further comprising consolidating shipments into waybills for all cross-dock shipments.

7. The method of claim 6 wherein the waybill comprises a standard trade invoice for each individual delivery.

8. The method of claim 6 wherein the waybill is included in the cross-dock shipment.

9. The method of claim 1 wherein the cross-dock shipment utilizes inter-company pricing when shipping through customs.

10. A system for cross-dock and direct shipment processes, comprising:
    an input device of a computer to receive an order to ship inventory from a default plant of a selling organization to a customer;
    a processor to change the default plant to a new plant of the selling organization, the new plant being located in another country which is a same country as a destination country of the customer but a different country than the default plant of the selling organization;
    wherein a cross dock partner function is entered on the order to reflect an address of the new plant in the destination country, wherein the cross dock partner function is used by the selling organization to process the order and output sales documentation for the transfer of inventory from the default plant of the selling organization to the new plant of the selling organization, wherein the inventory is transferred inter-company from the default plant to the new plant, such that the inventory passes through customs inter-company before being shipped to the customer; and
    a display, wherein the order is processed on the computer such that the default plant, not the new plant, is displayed to the customer as a shipping plant.

11. The system of claim 10 further comprising inventory invoice documentation created in accordance with the processed order.

12. The system of claim 11 wherein the invoice documentation comprises a master commercial invoice and a master content list.

13. The system of claim 10 wherein the inter-company transfer reduces freight costs, importation taxes and documents required for export processing.

14. The system of claim 10 wherein the direct shipment comprises shipment of goods directly to the new plant.

15. The system of claim 10 further comprising shipments consolidated into waybills for all cross-dock shipments.

16. The system of claim 15 wherein the waybill comprises a standard trade invoice for each individual delivery.

17. The system of claim 15 wherein the waybill is included in the cross-dock shipment.

18. The system of claim 10 wherein the cross-dock shipment utilizes inter-company pricing when shipping through customs.

* * * * *